(12) United States Patent  
Iwata et al.

(10) Patent No.: US 6,662,314 B1  
(45) Date of Patent: Dec. 9, 2003

(54) MICROCOMPUTER INCLUDING PROGRAM FOR REWRITING DATA IN AN INTERNAL FLASH MEMORY

(75) Inventors: Shunichi Iwata, Tokyo (JP); Takashi Nasu, Tokyo (JP); Fumitaka Fukuzawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,060

(22) Filed: Apr. 13, 2000

(30) Foreign Application Priority Data

Nov. 15, 1999 (JP) ............................................. 11-324356

(51) Int. Cl.[7] ................................................. G06F 11/00
(52) U.S. Cl. ........................... 714/42; 714/30; 711/103; 717/168
(58) Field of Search ..................... 711/103; 717/168; 714/27, 30, 42

(56) References Cited

U.S. PATENT DOCUMENTS

| | | | | |
|---|---|---|---|---|
| 5,574,857 A | * | 11/1996 | Ramakrishnan et al. | 714/54 |
| 5,805,794 A | * | 9/1998 | Jones et al. | 714/37 |
| 5,835,503 A | * | 11/1998 | Jones et al. | 714/719 |
| 5,841,867 A | * | 11/1998 | Jacobson et al. | 713/187 |
| 6,243,842 B1 | * | 6/2001 | Slezak et al. | 714/724 |
| 6,349,397 B1 | * | 2/2002 | Koga et al. | 714/727 |

FOREIGN PATENT DOCUMENTS

| | | |
|---|---|---|
| JP | 8-185336 | 7/1996 |
| JP | 9-319727 | 12/1997 |
| JP | 10-214201 | 8/1998 |

OTHER PUBLICATIONS

"IEEE Standard Test Access Port and Boundary–Scan Architecture", IEEE std 1149.1–1990 (includes IEEE Std 1149.1a–1993), Oct. 21, 1993.

* cited by examiner

Primary Examiner—Scott Baderman  
Assistant Examiner—Tim M. Bonura  
(74) Attorney, Agent, or Firm—Burns, Doane, Swecker & Mathis, LLP

(57) ABSTRACT

A microcomputer of the present invention permits a direct control of a rewrite operation on an internal flash-memory to enhance the efficiency of a debugging operation. The microcomputer has a first storage means that stores a program for rewriting data into an internal flash memory, a second storage means that stores internal flash information about the internal flash memory, an interface that makes a connection to a debugging tool, and a CPU. The CPU allows reading of the internal flash information by the debugging tool through the interface, receiving of write data based on the internal flash information from the debugging tool through the interface, and rewriting of the write data as new contents into the internal flash memory in accordance with the program for rewriting data into the internal flash memory.

13 Claims, 15 Drawing Sheets

FIG.9

LIST OF INFORMATION ABOUT REWRITE ON INTERNAL FLASH MEMORY

| REGISTER/AREA | STORAGE LOCATION | STORAGE INFORMATION |
|---|---|---|
| 24 TOOL ROM AREA | INTERNAL SPACE (ADDRESS : H'FF003FE0-FF) | INFORMATION ABOUT SECURITY CODE STORAGE AREA, INTERNAL MEMORY INFORMATION AREA, AND INTERNAL FLASH INFORMATION STORAGE AREA |
| 25 SECURITY CODE STORAGE AREA | INTERNAL SPACE (ADDRESS IS SPECIFIED BY TOOL ROM AREA) | SECURITY CODE (COMPARE BETWEEN USER-INPUT CODE AND SECURITY CODE, AND THEN OPERATION OF TOOL IS RESTRICTED IF IT IS MISMATCHED) |
| 26 INTERNAL FLASH INFORMATION STORAGE AREA | INTERNAL SPACE (ADDRESS IS SPECIFIED BY TOOL ROM AREA) | BLOCK ORGANIZATION OF INTERNAL FLASH MEMORY, ENTRY ADDRESS OF E/W CONVERSION PROGRAM |

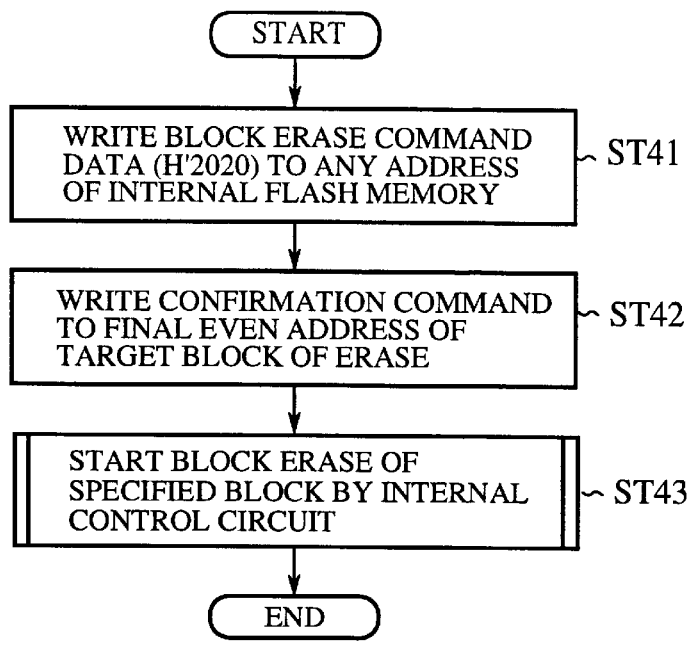
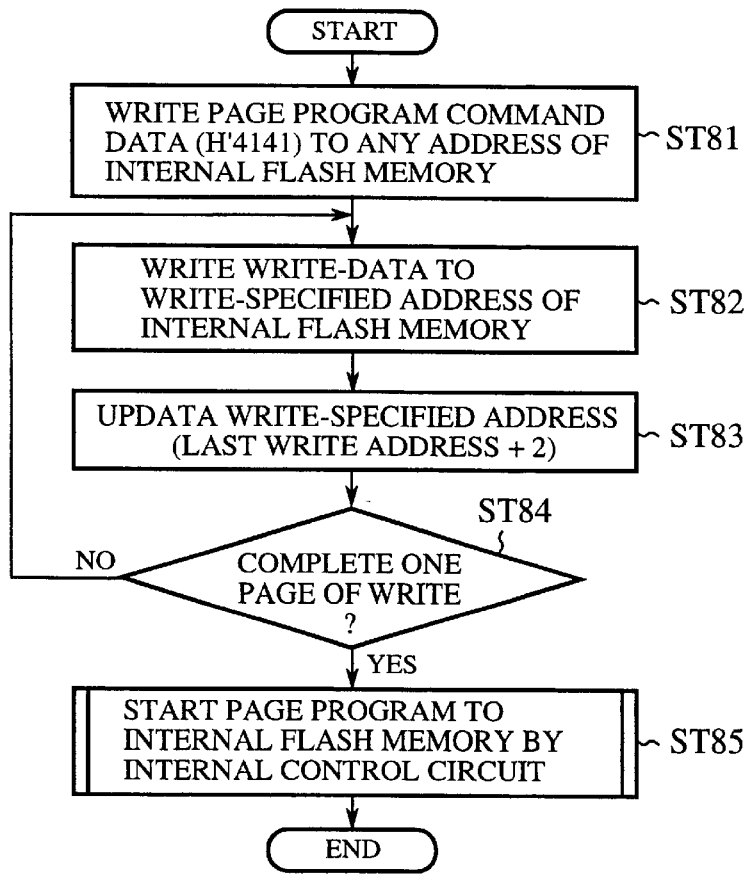

MICROCOMPUTER INCLUDING PROGRAM FOR REWRITING DATA IN AN INTERNAL FLASH MEMORY

BACKGROUND OF THE INVENTION

1. Field of the Invention

The present invention relates to a microcomputer suitable for debugging under a practical use environment.

2. Description of Related Art

Conventionally, debugging tools such as ICE (emulator) have been used for debugging microcomputers installed in microcomputer-applied systems and so on. If a flash-memory is integrated in the microcomputer, the need for rewriting data into such a flash-memory arises at the time of debugging. However, the conventional debugging tools do not have any means for rewriting data into the flash-memory of the microcomputer. Therefore, the rewriting procedure is performed through the use of a flash writer. The flash writer is a tool designed specifically for rewriting data into the flash-memory. Alternatively, the user may prepare a program for rewriting data into the flash-memory. In this case, the debugging tool executes such a program to rewrite data into the flash-memory.

Since the conventional microcomputer is configured as described above, there are some problems that need to be addressed.

The cost of debugging the microcomputer is high because the flash writer should be prepared in addition to the debugging tool if the user debugs the conventional microcomputer through the use of the flash writer. Also, an appropriate flash writer should be selected so as to correspond to the type of the flash-memory. Thus, the type of flash writer varies every time the configuration of flash-memory device changes. Consequently, reductions in debugging efficiency have occurred.

Furthermore, the rewriting procedure using the debugging tool must be performed by the execution of a program for rewriting data into the flash-memory. In this case, however, such a program must be prepared by the user at much expense in time and effort. Therefore, debugging inefficiency results.

Another problem is that the configuration of the conventional microcomputer restricts the capabilities of the debugging tool. That is, the procedure described above for rewriting data into the flash-memory cannot control a rewrite operation on the flash-memory directly from the debugging tool, so that they cannot use the debugging functions (e.g., a software-break function) associated with the rewrite of the flash-memory.

SUMMARY OF THE INVENTION

The present invention is implemented to solve the foregoing problems. It is therefore an object of the present invention is to provide a microcomputer that permits a direct control of the rewriting of an internal flash-memory to enhance the efficiency of debugging operation.

According to first aspect of the present invention, there is provided a microcomputer comprising: a first storage means that stores a program for rewriting data into an internal flash memory, a second storage means that stores internal flash information about the internal flash memory; an interface that makes a connection to a debugging tool; and a CPU, wherein the CPU allows reading of the internal flash information by the debugging tool through the interface, receiving of write data based on the internal flash information from the debugging tool through the interface, and rewriting of the write data as new contents into the internal flash memory in accordance with the program for rewriting data into the internal flash memory.

Here, the first storage means may be at least a part of an internal flash memory.

The program for rewriting data into the internal flash memory may comprise an E/W mode conversion program for shifting to a mode that allows an erase operation and an write operation on the internal flash memory; an erase program for erasing contents of the internal flash memory; a write program for writing new contents into the internal flash memory; a status-ready wait program for indicating the completion of the erase operation and the write operation; and an E/W mode completion program for returning from a mode that allows both erase and write operations on the internal flash memory to a normal mode.

The second storage means may be at least a part of an internal flash memory.

The internal flash information may include: block information about block sizes and addresses of the internal flash memory; and rewrite program information about the leading addresses of the rewrite program.

The internal flash information may include information that indicates a location of storing a security code.

The internal flash information may include information that indicates locations of areas to be used for saving the rewrite program of the internal flash memory and holding the write data temporary.

The internal flash information may include information about a size of the area to be used for holding the write data temporary at the time of rewriting the internal flash memory.

According to a second aspect of the present invention, there is provided a microcomputer comprising: a first storage means that stores a program for rewriting data into the internal flash memory; a second storage means that stores internal flash information about the internal flash memory; an interface that makes a connection to a debugging tool; and a CPU, wherein the CPU allows execution of debugging based on an instruction code of a debug program held in a first register by the debugging tool through the serial interface in conjunction with holding internal flash information stored in the second storage means in a second register so that the internal information is readable by the debugging tool through the serial interface, and a rewrite operation in which write data based on the internal flash information held in a third register is written into the internal flash memory in accordance with the program for rewriting data into the internal flash memory by the debugging tool through the serial interface.

Here, the serial interface may be a JTAG interface.

The microcomputer may further comprise: a means for rewrite permission that allows rewriting of the internal flash memory forcefully in debug mode even an input value of a FP terminal that permits rewriting of the internal flash memory.

The microcomputer may further comprise: a means for executing an E/W mode conversion program for shifting to a mode that allows an erase operation and an write operation on the internal flash memory by the CPU based on a branch instruction code for a E/W mode conversion program which is produced from the debugging tool; a means for executing an erase program for erasing a block corresponding to an address of the internal flash memory produced from the debugging tool through the execution of the erase program by the CPU based on the branch instruction code for the E/W mode conversion program which is produced from the debugging tool; a means for executing a status-ready wait program by the CPU based on a branch instruction code for a status-ready wait program which is produced from the debugging tool. to allow that the debugging tool to read out information about the status of executing the erase operation on the internal flash memory; and an E/W mode completion program for a shift to a normal mode through the execution of an E/W mode completion program by the CPU based on a branch instruction code for the E/W mode termination program produced from the debugging tool after repeating the execution of both means for executing the erase program and status-ready wait program only a predetermined number of times in accordance with blocks to be cleared from the internal flash memory if the information about the status of executing the erase operation on the internal flash memory is recognized as normal.

The microcomputer may further comprise: a means for executing an E/W mode conversion program for shifting to a mode that allows an erase operation and an write operation on the internal flash memory by the CPU based on a branch instruction code for a E/W mode conversion program which is produced from the debugging tool; a means for executing an erase program for erasing a block corresponding to an address of the internal flash memory produced from the debugging tool through the execution of the erase program by the CPU based on the branch instruction code for the E/W mode conversion program which is produced from the debugging tool; a means for executing a write program for writing write data produced from the debugging tool to an address of the internal flash memory produced from the debugging tool through the execution of the write program by the CPU based on a branch instruction for the write program produced from the debugging tool; a means for executing a status-ready wait program by the CPU based on a branch instruction code for a status-ready wait program which is produced from the debugging tool to allow that the debugging tool to read out information about the status of executing the write operation on the internal flash memory; and an E/W mode completion program for a shift to a normal mode through the execution of an E/W mode completion program by the CPU based on a branch instruction code for the E/W mode termination program produced from the debugging tool after repeating the execution of the means for executing the erase program, the means for executing the write program, and the means for executing the status-ready wait program only a predetermined number of times in accordance with blocks to be rewritten into the internal flash memory if the information about the status of executing the write operation on the internal flash memory is recognized as normal.

The above and other objects, effects, features, and advantages of the present invention will become more apparent from the following description of embodiments thereof taken in conjunction with the accompanying drawings.

BRIEF DESCRIPTION OF THE DRAWINGS

FIG. 9 is a table for illustrating the information about a rewrite of contents in an internal flush-memory chip;

FIG. 15 is a flow chart for illustrating the details of the operation for erasing the contents of the internal flash-memory;

FIG. 17 is a flow chart for illustrating the details of an operation for rewriting the contents of the internal flush memory.

DETAILED DESCRIPTION OF THE PREFERRED EMBODIMENTS

The invention will now be described in detail with reference to the accompanying drawings.

First Embodiment

Figure 1:
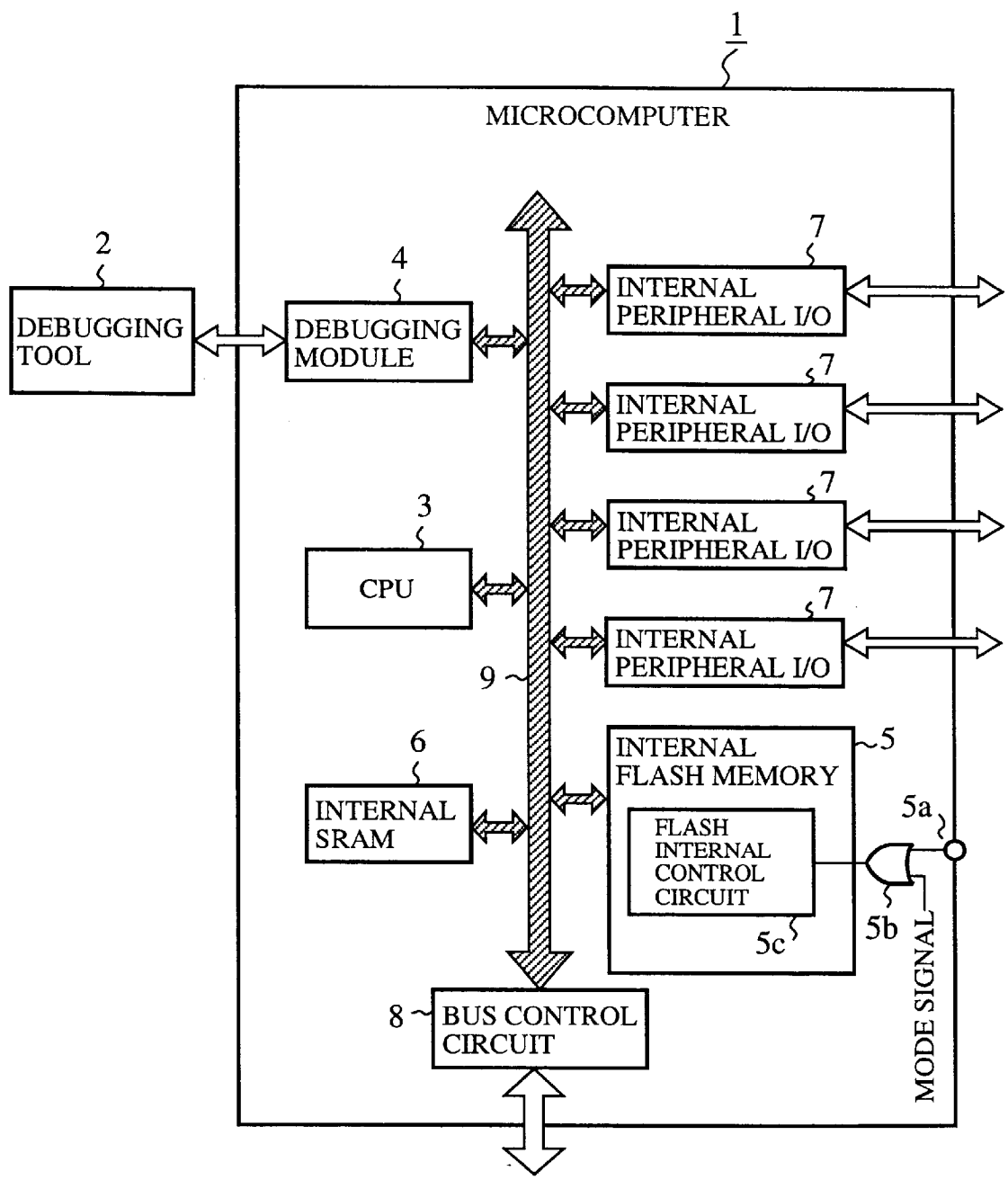
FIG. 1 is a block diagram for illustrating the configuration of a microcomputer as a first preferred embodiment of the present invention.

FIG. 1 illustrates the configuration of a microcomputer as a first preferred embodiment of the present invention. In the figure, the reference numeral 1 denotes a microcomputer having a one-chip microprocessor, which is provided in a microcomputer-application hardware. The reference numeral 2 denotes a general-purpose debugging tool to be connected to the microcomputer 1 at the time of debugging. In the microcomputer 1, furthermore, the reference numeral 3 denotes a central processing unit (CPU) provided as a microprocessor comprising sixteen 32-bit general-purpose registers (R0–R15), 4 denotes a debugging module, 5 denotes an internal flash-memory, 6 denotes an internal static random access memory (internal SRAM), 7 denotes an input-output (I/O) unit including an internal peripheral direct memory access controller (DMA controller), an interrupt controller, and a timer 8 denotes a bus-control circuit, and 9 denotes a 32-bit internal bus that connects the above modules to each other.

In the periphery of the internal flash-memory 5, the reference numeral 5a denotes a FP terminal, 5b denotes an OR circuit, and 5c denotes an internal control circuit of the flash-memory. The FP terminal 5a generates a flash-protect signal that permits the rewriting by an input value of "1 (one)" and prohibits the rewriting by an input value of "0 (zero)". The OR circuit 5b carries out the logical OR between the flash-protect signal and a mode signal, where the mode signal is generated from the CPU 3 and takes on either "1" at a debut mode or "0" at a normal mode. Furthermore, the OR circuit generates an output value of "1" or "0", while the flash-memory's internal control circuit 5c allows the rewriting of the internal flash-memory 5 if the output value takes on "1" or prohibits the rewriting if it takes on "0". The OR circuit 5b and the flash internal control circuit 5c make up a means that permits a rewrite of the internal flash-memory 5 at the debug mode without distinction of the input value of a FP terminal 5a.

Figure 2:
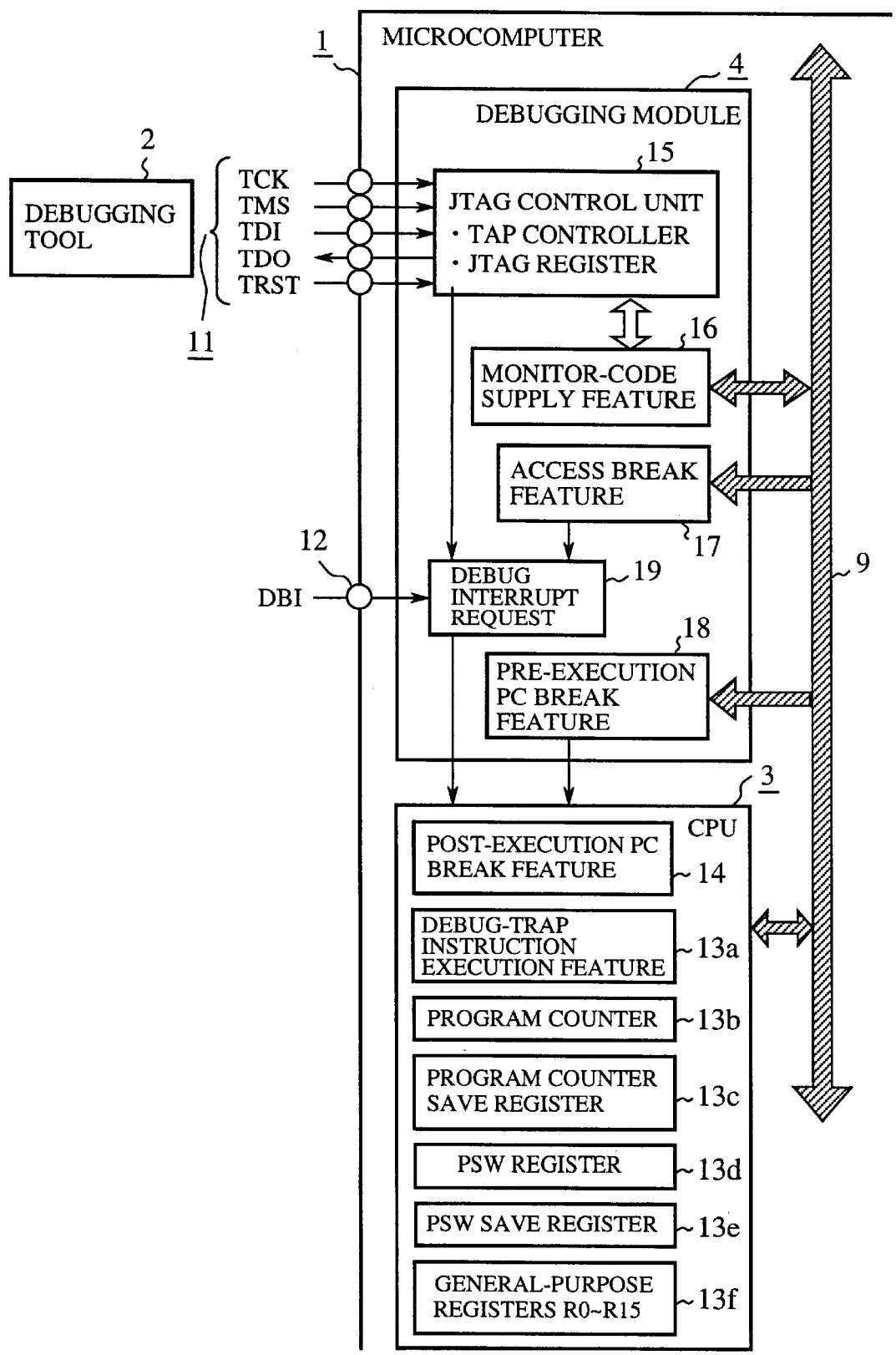
FIG. 2 is a block diagram for illustrating the detailed configurations of CPU and a debugging module in the microcomputer.

FIG. 2 is a block diagram for illustrating the configurations of the central processing unit (CPU) and the debugging module. In the figure, the reference numeral 11 denotes a set of five JTAG interface terminals (or simply referred to as interfaces or serial interfaces) which is defined by IEEE 1149.1 and connects a debugging module 4 to an external debugging tool 2. The JTAG interface terminals include:

"TCK" terminal provided as a clock input terminal;

"TDI" terminal provided as an input terminal for the serial input of a test command code and test data;

"TDO" terminal provided as an output terminal for the serial output of a test command code and test data;

"TMS" terminal provided as an input terminal for the input of a test mode selection that regulates a state transition of a test circuit; and "TRST" terminal provided an input terminal for the input of a test reset that initializes a test circuit asynchronously Furthermore, the reference numeral 12 denotes an input terminal for the input of a debug interruption from an outside source to the CPU 3

In the CPU 3, the reference numeral 13a denotes a debug trap instruction execute function provided as a debug-specific trap instruction. The CPU 3 executes this instruction to generate a debug event, resulting in a shift to the debug mode. Also, the reference numeral 13b denotes a program counter provided as a register that stores an address of the instruction being executed by the CPU-3. The reference numeral 13c denotes a program counter (PC) save register. The PC save register 13c saves a program counter value at the time of generating the debug event or the like. The reference numeral 13d denotes a PSW register that indicates the state of the CPU 3. The reference numeral 13e denotes a PSW save register that saves a PSW register value at the time of generating the debug event or the like. The CPU 3 further comprises instruction execution functions (including load, store, branch, and addition instructions) and sixteen general-purpose registers (R0 to R15) 13f just as in the case of the conventional CPUs. These functions and registers are almost irrelevant to the present embodiment, so that their detailed explanation will be omitted from the following discussion in the interest of simplicity. The reference numeral 14 denotes a post execution PC break function 14 involved in a shift to debug mode by the steps of setting a program counter value of a target instruction and generating a debug event immediately after the execution of such an instruction.

In the debugging module 4, furthermore, the reference numeral 15 denotes a JTAG control unit involved in control of the debug function by carrying out communication with the debugging tool 2 via the JTAG interface terminals 11. The JTAG control unit includes debug-related control registers accessible by the JTAG interface terminals 11 and a TAP controller. The TAP controller controls an access from the JTAG interface terminals 11. The reference numeral 16 denotes a monitor-code supply function and 17 denotes an access break function. When the target data access condition is established, the access break function 17 detects a data access that satisfies an established condition. Subsequently, the access break function 17 outputs a debug interrupt request to the CPU 3 if the condition is satisfied. The reference numeral 18 denotes a pre-execution PC (program counter) break request function that outputs a pre-execution PC break request to the CPU 3 after detecting that the instruction is fetched when a program counter value of a target instruction is established. Then, a debug event is generated just before the execution of such an instruction when the CPU 3 receives the pre-execution PC break request, resulting in a shift to debug mode. The reference numeral 19 denotes a debug interrupt request involved in a debug-specific interrupt. The debug interrupt request 19 is an output to the CPU 3 after unifying debug interrupt requests generated from the DBI terminal 12, the JTAG control unit 15, and the access break function 17 by executing a logical OR among them. A debug event is generated when the debug request is entered into the CPU 3, resulting in a shift to debug mode.

As described above, the microcomputer 1 incorporates a debug feature principally controlled by the debugging module 4.

Here, we elaborate on Joint Test Action Group (JTAG) as follows. Making board-level testing procedures on current-day microcomputer applications becomes much more difficult because of larger packing densities, larger scale of device integration, large-scale production, and fine-pitch surface mounting. For solving the problems in such board-level testing procedures, therefore, JTAG has been organized under the leadership of European manufacturers in the fields of semiconductors, electronic devices, and testers. JTAG proposes board-level test procedures known as a boundary scan method currently defined in IEE Standard Test Access Port and Boundary Scan Architecture (IEEE Standard 1149.1a-1993).

The boundary scan method comprises the steps of inserting a scan register circuit (boundary scan) between input-output (I/O) pins and an internal circuit in each of devices mounted on a board and further providing a control circuit and its specific pins on the board. Boundary scans of the corresponding devices on the board are connected to each other, so that all of the scan registers can be serially accessed and controlled by the input and output of data through a specific port. Therefore, we can test the connections among devices on the board and the internal workings of each device by serially entering instructions and data into the devices and reviewing output data serially produced from them without contacting testing probes onto the board.

The components that make up the boundary scan comprises:

TAP (Test Access Port) involved in the input-output of data and the control for the boundary scan, corresponding to the JTAG interface terminals 11 shown in FIG. 2;

TAP controller involved in the control of testing circuits by doing status transition in response to the inputs from both TCK and TMS terminals;

instruction registers that hold test instruction codes to generate control signals of the test circuit by decoding these codes, where the instructions are SAMPLE/PRELOAD, EXTEST, and BYPASS and also device-specific private instructions may be further included; and data registers including
- bypass register which is a one-bit register placed between TDI and TDO terminals and is used for bypassing the test circuit,
- boundary scan register which is provided as a series of registers that serially connects shift registers to each other, where each of the shift register is provided between an internal circuit of the device and each pin, and
- device-specific registers which may be included in addition to the above registers.

Regarding the configuration of the above boundary scan, the microcomputer of the first embodiment has a number of private instructions for the internal debug feature and/or a number of private data registers for the internal debug feature.

Figure 3:
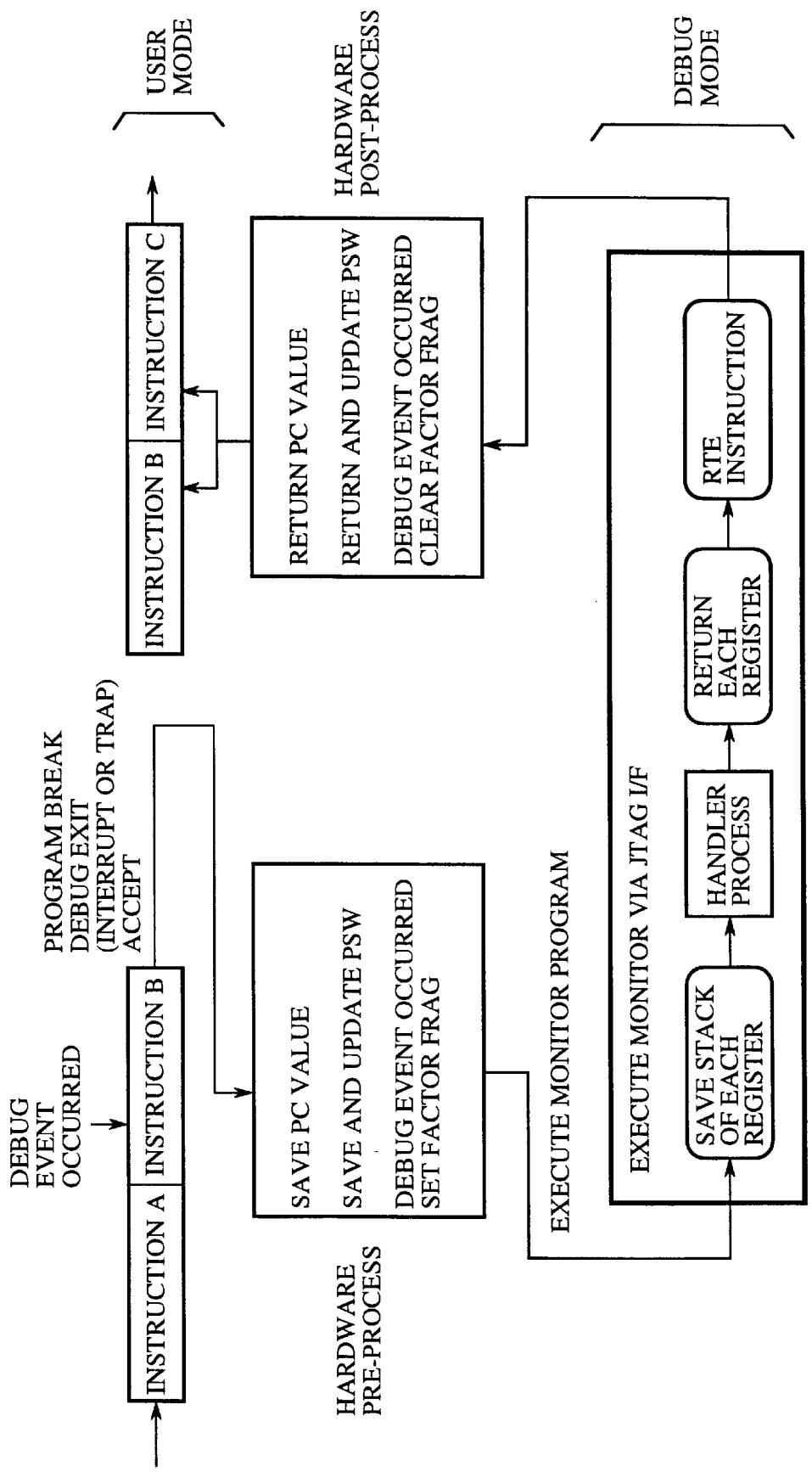
FIG. 3 is a block diagram for illustrating a series of steps which is carried out when a debugging event is encountered.

FIG. 3 is an explanation diagram that a series of steps in the procedure at the time of generating a debug event.

A microcomputer 1 has two execution modes: a user mode and a debug mode. The user mode is the state in which a user program is executed. If a debug event is generated during the execution of the user program, it is switched from the user mode to the debug mode. The debug mode is the state in which a monitor program supplied from the debugging tool 2 is executed.

The debug events include the execution of a debug-trap instruction, a debug-interrupt request, and a pre-execution/post-execution program counter break request. If the debug event is generated, the CPU 3 and the debugging module 4 automatically perform the following process, followed by a shift to the debug mode.

The PC save register 13c saves the value of the program counter 13b.

The PSW save register 13e saves the-value of the PSW register 13d, followed by updating the value.

A debug-event occurrence flag for indicating the occurrence of any debug event is set to a JTAG register in the JTAG control unit 15.

A branch to a vector address (H'FFFF9000) of the debug event is caused.

After branching to the vector address of the debug event, the debugging tool 2 executes a monitor program by supplying an instruction code to the CPU 3 through the use of a monitor-code supplying feature 16.

By executing a return instruction (RTE instruction) to return to the user mode, it is switched from the debug mode to the user mode. At the time of switching to the user mode, the CPU 3 and the debugging module 4 carry out the following procedure automatically.

The debug-event occurrence flag is cleared.

The value saved in the PSW save register 13e is returned to the PSW register 13d.

The value saved in the program counter save register 13c is returned to the program counter 13b, and in addition a branch to the address of such a value is caused.

Figure 4:
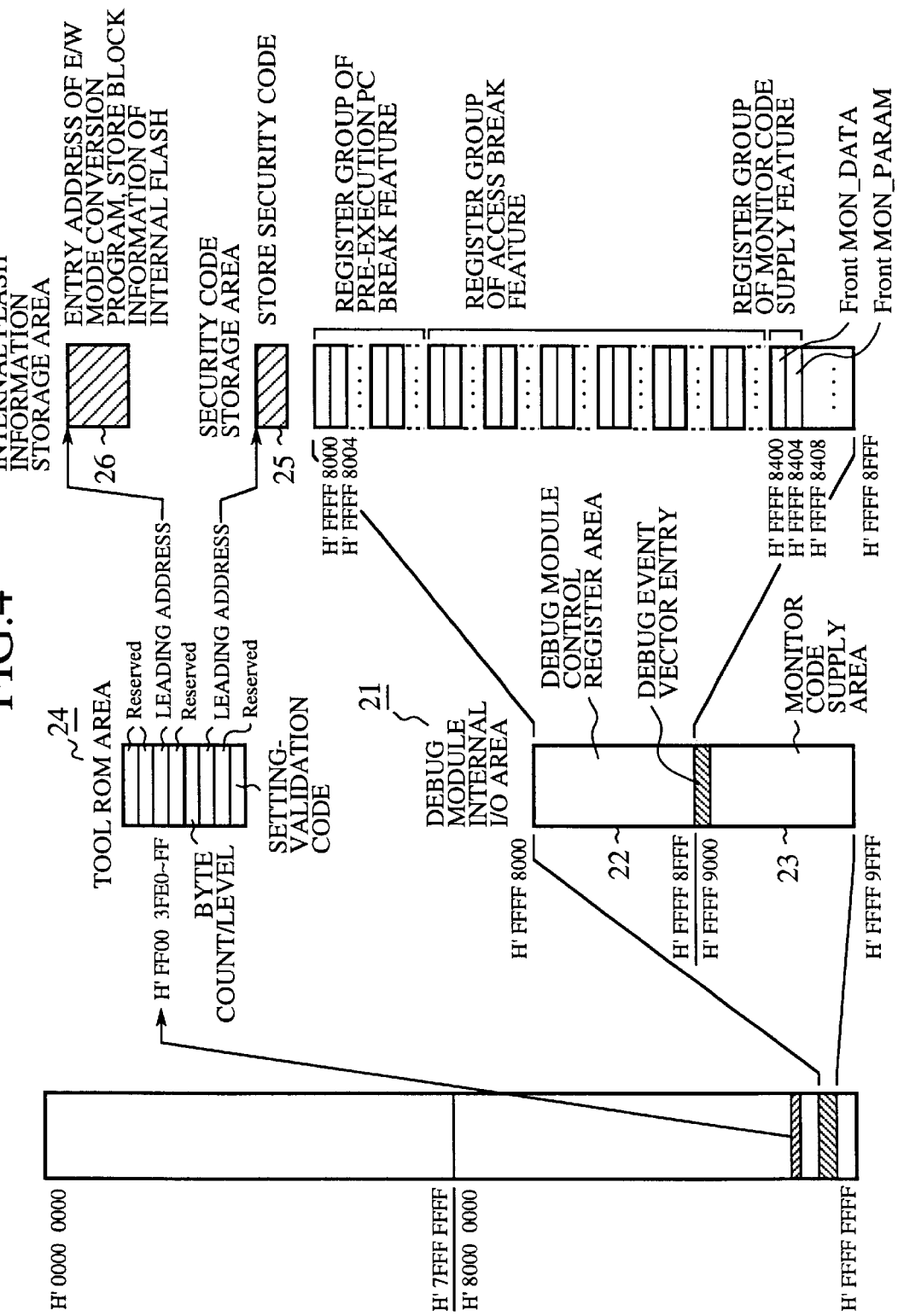
FIG. 4 is a block diagram for illustrating areas for the debugging module which are mapped in an internal area.

FIG. 4 is an explanation diagram that shows a debugging module area mapped in an internal area. In the figure, the reference numeral 21 denotes a debugging-module internal I/O area (H'FFFF8000 to H'FFFF9FFF), 22 denotes a debugging-module control register area (H'FFFF8000 to H'FFFF8FFF) in which a register group for pre-execution PC-break feature, a resister group for access break feature, and a register group for monitor-code supply feature 16 are placed. The reference numeral 23 denotes a monitor-code supply area (H'FFFF9000 to H'FFFF9FFF) which is able to access to the monitor-code supply feature 16. An instruction fetch in this area fetches instruction codes passing through the JTAG interface terminals 11, all of which uses the monitor-code supply feature 16. A debug-event vector entry ((H'FFFF9000 to H'FFFF9003) branches such an area when the debug event is occurred.

Furthermore, the reference numeral 24 denotes a tool ROM area (H'FF003FE0 to H'FF003FFF) that stores addresses on which a security code and internal flash information are placed. The reference numeral 25 denotes a security-code storage area having its own predetermined address and byte count which are designated in the tool ROM area 24. The reference numeral 26 denotes an internal flash information storage area that stores an entry address of an E/W mode conversion program and information about a block structure of the internal flash-memory 5. The E/W mode conversion program is one of internal flash rewrite programs (hereinafter, referred to as a rewrite program). An address and a byte count of this area 26 are designated in the tool ROM area 24.

Figure 5:
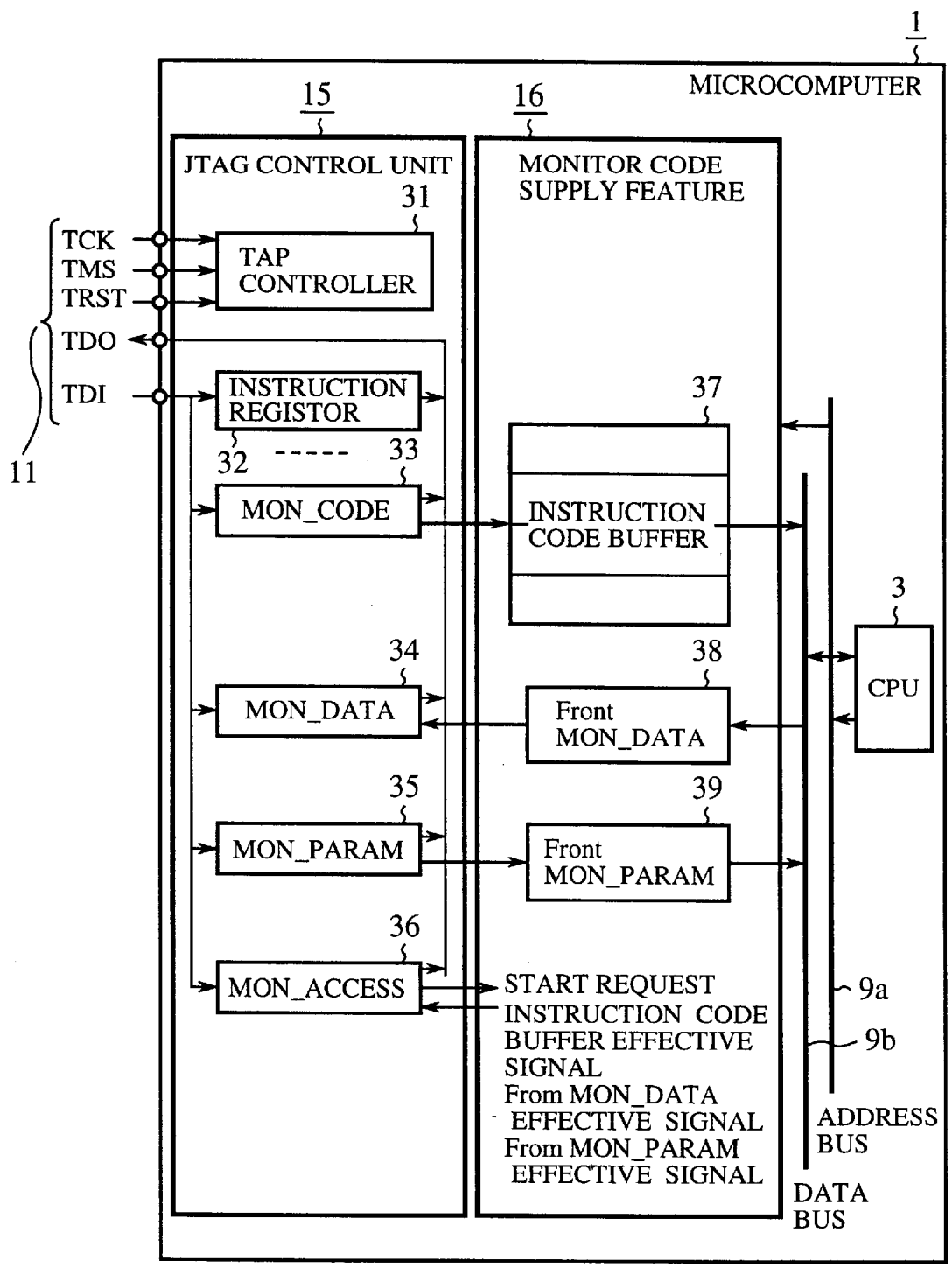
FIG. 5 is a block diagram for illustrating the configurations of a JTAG control unit and a monitor-code supply feature in the microcomputer.

FIG. 5 illustrates the register organizations of the monitor-code supply feature 16 and the JTAG control unit 15 in the microcomputer 1. In this figure, the monitor-code supply feature 16 supplies an instruction code from the outside to the CPU 3 through the JTAG interface terminals 11. If the debug event occurs, the CPU 3 executes an instruction code supplied from the monitor-code supply feature 16 by causing a branch to an address of H'FFFF9000 on the head of the monitor-code supply area 23 shown in FIG. 4.

In the JTAG control unit 15, the reference numeral 31 denotes a TAP controller that controls access to data via the JTAG interface terminals 11 and 32 denotes an instruction register that selects any one register to perform an appropriate test. The reference numeral 33 denotes a MON_CODE register (a first register). This register 33 is a 32-bit register to be used in the setting of an instruction code supplied from the debugging tool 2 when the monitor program is executed though the JTAG interface terminals 11 at the time of a debug mode. The value set to the MON_CODE register 33 is transferred to an instruction code buffer 37 of the monitor-code supply feature 16. Simultaneously, an input pointer of the instruction code buffer 37 is automatically incremented.

The reference numeral 34 is the MON_DATA register (a second register). This register 34 is a 32-bit register to be used as an interface that outputs internal flash information to the debugging tool 2 or output the execution results to the debugging tool 2 when a monitor program is executed through the JTAG interface terminals 11 at the time of the debug mode. If the monitor program uses a store instruction for the write to the FrontMON_DATA register 38 of the monitor-code supply feature 16, the value is transferred to the MON_DATA register 34 and is readable from the debugging tool 2 through the JTAG interface terminals 11.

The reference numeral 35 denotes the MON_PARAM register (a third register). This register 35 is a 32-bit register to be used as an interface for passing parameters including rewrite data from the debugging tool 2 when the monitor program is executed through the JTAG interface terminals 11 at the time of debug mode. If a write operation is performed on the MON_PARM. register 35 by the debugging tool 2 through the JTAG interface terminal 11, it is transferred to the FrontMON_PARAM register 39 of the monitor-code supply function 16 and then the value can be readable using a load instruction on the monitor program.

The reference numeral 36 denotes the MON_ACCESS register, which is a 4-bit register for the setting and the storage of access control information when the monitor program is executed through the JTAG interface terminals 11 at the time of debug mode.

Bit 0 MNSTART Monitor-code Supply Starting Bit (Readable/Writable)

1: instruction code is established

0: instruction code is not established

If the bit is set to "1", it is indicated that a value useful for an instruction code buffer 37 is established. That is, an instruction fetch requirement in the monitorcode supply feature 16 becomes acceptable.

Bit 1 MNDTVLD the FrontMON_DATA Significant Bit (Read Only)

1: The FrontMON_DATA significant (the FrontMON_PARAM register 38 has written upon, and the MON_DATA register 34 is not referred to)

0: The FrontMON_DATA invalid (nothing is written to the FrontMON_DATA register 38, or following a reference to the MON_DATA register 34)

This bit is set to "1" when The FrontMON_DATA register 38 is written upon. Then, the bit is zero-cleared under the following conditions:

at the time when the MON_DATA register 34 is accessed;

at the time of executing RTE instruction in the debug mode; and at the time of resetting the debug control unit (reset the debugging module).

Bit 2 MNPRMVLD The FrontMON_PARAM Significant Bit (Read Only)

1: the FrontMON_PARAM significant (the MON_PARAM register 35 is being established, but The FrontMON_PARAM register 39 is not read out)

0: the FrontMON_PARAM invalid (the MON_PARAM register 35 is not established, or following the read out of the FrontMON_PARAM register 39)

This bit is set to "1" when the bit is set to the FrontMON_DATA register 39. Then, the bit is zero-cleared under the following conditions:

at the time that the reading is carried out on the FrontMON_PARAMregiser39;

at the time of executing RTE instruction in the debug mode; and

At the time of resetting the debug control unit (reset the debugging module).

Bit 3 MNCDBUSY the MON_CODE Busy Bit (Read Only)

1: setting to the MON_CODE is impossible

0: setting to the MON_CODE is possible

This bit indicates that the setting of the next instruction code to the MON_CODE register 33 is allowable or not. This bit includes the following two meanings (1) and (2):

(1)

"1"=the transfer of data from the MON_CODE register 33 to the instruction code buffer 37 is in progress; and "0"=the transfer of data is completed.

(2)

"1"=a un-fetched instruction code is found in the instruction code buffer; and

"0"=a un-fetched instruction code is not found in the instruction code buffer.

This bit is set to "1" under the following condition:

at the time that "1" is set to the MNSTART bit.

This bit is zero-cleared under the following condition:

at the time that a value written in the MON_CODE register 33 is transferred to the instruction code buffer 37; and at the time that all of the instructions stored in the instruction code buffer 37 is fetched by CPU 3 (see note 1);

at the time of the execution of RTE instruction in the debug mode; and at the time of resetting the debug control unit (reset the debugging module).

Note 1: The followings are criteria for judging that a fetch of the instruction code buffer 37 is completed.

If a second instruction fetch requirement occurs, for a leading word of the instruction code buffer 37, it is concluded that all of the instruction codes of the instruction code buffer 37 is are fetched. For example, if a branch instruction is on the second word of the instruction code buffer 37, all of the instruction codes are is fetched at the time that an instruction fetch requirement of the target of the branch instruction on the second word occurs in the instruction code buffer 37, even if the instruction codes are set to the third and fourth words. If the branch is caused by the monitor-code supply feature 16, it is concluded that the requirement that "the branch target must be provided as the leading addresses of the instruction code buffer 37" constitutes a restriction of the debugging tool 2. That is, there is the need to make the branch target address of the branch instruction to be set to the MON_CODE resister 33 by the debugging tool 2 consistently as an address on the fourth word boundary (make 4 bytes [28:3] at the bottom end of the order of the address at "0000"). This limitation guarantees the instruction fetch requirement to the first word of the instruction code buffer 37 without exception when the branch is caused in the monitor-code supply feature 16.

In the monitor-code supply feature 16, the reference numeral 37 denotes an instruction code buffer. The buffer 37 consists of four words to which the content of the MON_CODE register 33 of JTAG control unit 15 is transferred. The instruction code buffer 37 is mapped to the address (H'FFFF9000 to H'FFFF9FFF) and a word to be selected is determined by 2 bits at the bottom end of the order of the address.

The reference numeral 38 denotes the FrontMON_DATA register. This register 38 is a 32-bit register for providing the debugging tool 2 with the execution results and the internal flash information. The contents of the FrontMON_DATA register 38 are transferred to the MON_DATA register 34 of the JTAG control unit 15.

The reference numeral 39 denotes the FrontMON_PARAM register. This register 39 is a 32 bit register for passing parameters such as rewrite data from the debugging tool 2 to the monitor program. The contents of the MON_PARAM register 35 of the JTAG control unit 15 are transferred to the FrontMON_PARAM register 39.

The reference numeral 9*a* denotes an address path and 9*b* denotes a data path.

Figure 6:
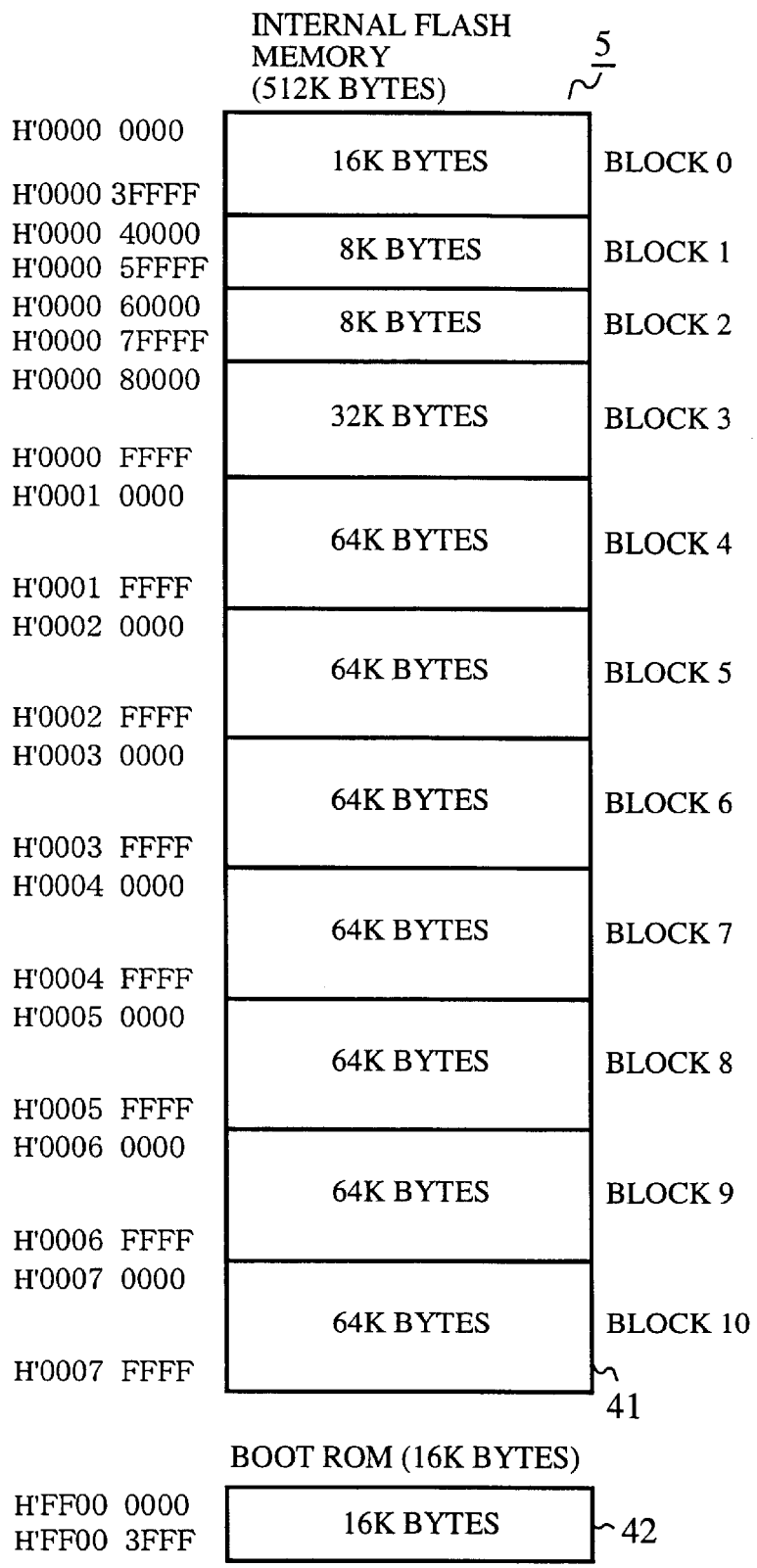
FIG. 6 is a block diagram for illustrating a memory map of an internal flash-memory.

FIG. 6 is an explanation diagram that illustrates a memory area of an internal flash-memory. In the figure, the reference numeral 41 denotes a user area and 42 denotes a boot ROM area. The user area 41 corresponds to a user-available area where 512 K-bytes of flash-memory are allocated on the addresses of H'00000000 to H'0007FFFF and divided into 11 blocks. The internal flash-memory 5 can be erased in blocks or erased in a set of blocks as a single unit. On the other hand, the internal flash-memory 5 can be written upon in pages (one page corresponds to 256 bytes). The erase and write operations on the internal flash-memory 5 can be allowed by shifting to a flash erasable and writable (E/W) mode described below.

A boot ROM area 42 of the internal flash-memory 5 is provided as a 16 K-byte flash-memory allocated on the addresses (H'FF000000 to H'FF003FFF) and stores a rewrite program for the internal flash-memory 5.

Figure 7:
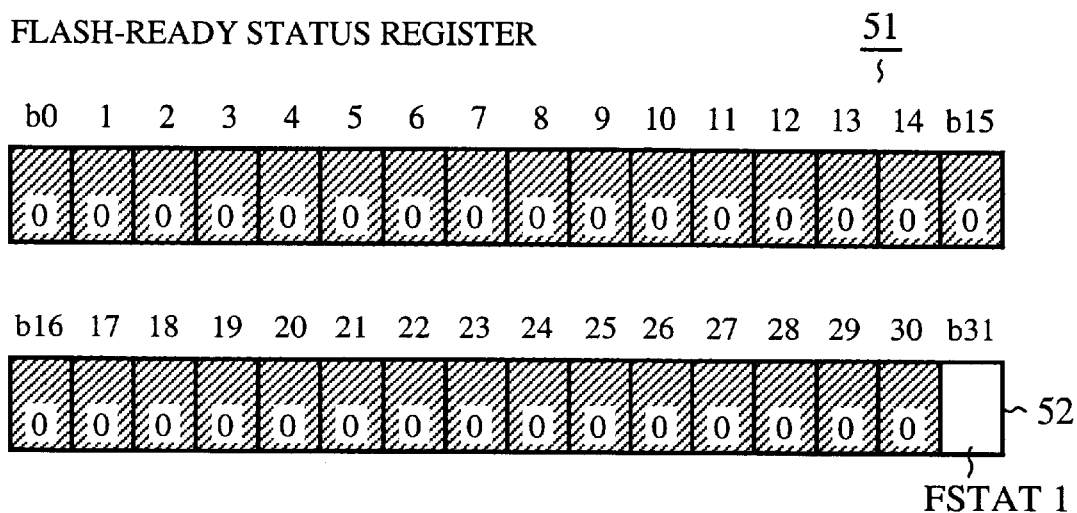
FIG. 7 is a block diagram for illustrating the contents of a flush-ready status register.

FIG. 7 is an explanation diagram that illustrates a flash ready-status register. In the figure, the reference numeral 51 is a flash ready-status register, which is a 32-bit register provided in the internal flash-memory 5. The reference numeral 52 denotes a FSTAT (ready-status) bit provided in the flash ready-status register 51, indicating the status of the erase and write operations on the internal flash-memory 5.

0: under erase or write operation

1: in a ready state

The FSTAT bit 52 is controlled by the flash internal control circuit 5c shown in FIG. 1.

Figure 8:
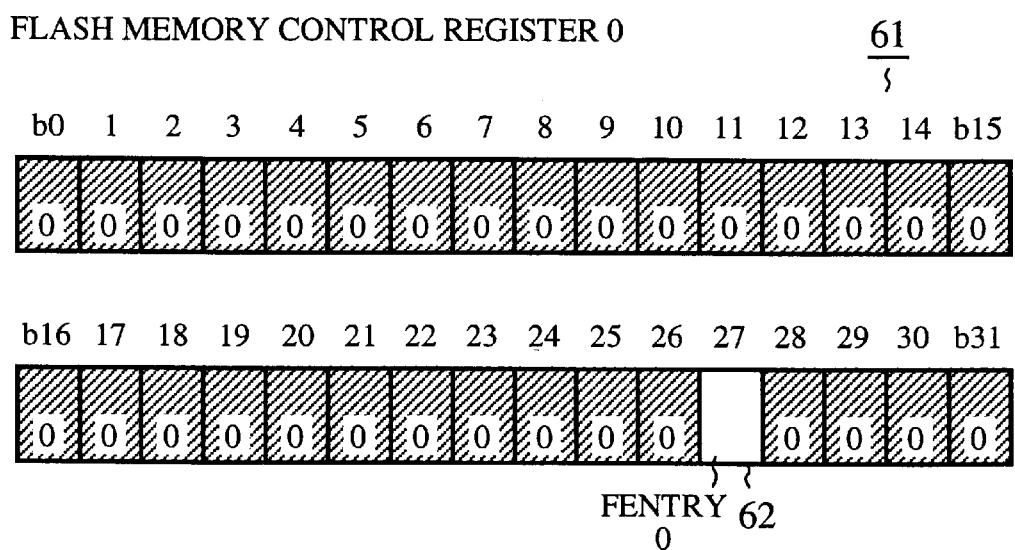
FIG. 8 is a block diagram for illustrating the contents of a flash-memory control register.

FIG. 8 is an explanation diagram that illustrates a flash-memory control register. In the figure, the reference numeral 61 denotes a flash-memory control register, which is a 32-bit register provided in the internal flash-memory 5. The reference numeral 62 denotes a FENTRY (Flash mode entry) bit, which is provided in the flash-memory control register 61 and controls a shift to the flash E/W enable mode.

It goes into a flash E/W enable mode by setting the bit to "1" and it returns to a normal operation mode by setting the bit to "0".

It goes into a flash E/W enable mode by setting the bit to "1" and it returns to a normal operation mode by setting the bit to "1".

The FENTRY bit 62 is controlled by the flash internal control circuit 5c.

FIG. 9 is an explanation diagram that illustrates information regarding a rewrite operation on the internal flash-memory. In the figure, a tool ROM area 24 is an area for storing addresses and is located in an internal space as shown in FIG. 4. A security code and internal flash information are placed on those addresses.

Figure 10:
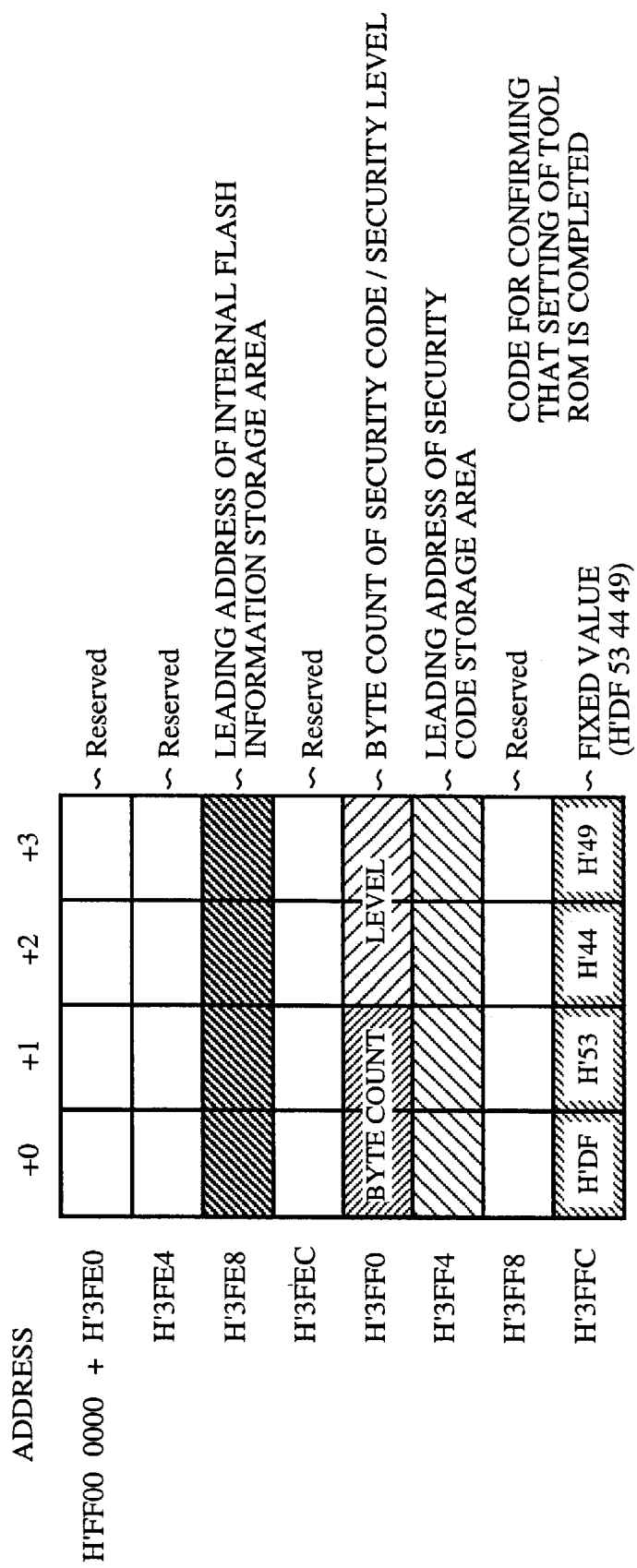
FIG. 10 is a block diagram for illustrating the contents of a tool-ROM area.

FIG. 10 is an explanation diagram that shows the organization of a tool ROM area. As shown in the figure, the location of the tool ROM area 24 is on the addresses of H'FF003FE0 to H'FF003FFF. For indicating that each piece of the information is set to the tool ROM area 24, a code with a fixed value (H'DF534449) is imbedded in the addresses of H'FF003FFC to F. The debugging tool 2 recognizes such a value of the code and then uses each piece of the information in the tool ROM area 24.

As shown in FIG. 9 and FIG. 10, furthermore, there are a security-code storage area 25 and the information of a security level. If the security code is established, a comparison between the security codes is performed on the side of the debugging tool 2. If they are mismatched, the operation of the tool is restricted depending on the security level.
H'FF003FF0-1 a Bit Number of the Security Code H'FF003FF2-3 a security level H'0000 level "0"

All of the operations are not authorized except. a reset of the debugging tool.

H'00001 level "1"

An operation of the debugging tool is not authorized unless the whole area of the internal flash-memory is erased.

HFF003FF4-7 the leading addresses of the security-code storage area.

If the security code is absent, the address is changed to H'FFFFFFFF.

As shown in FIG. 9 and FIG. 10, furthermore, the leading addresses of the internal flash information store area 26 are placed.

H'FF003FE8-EB The Leading Addresses of the Internal Flash Information Storage Area If the internal flash storage area is absent, the address is changed to H'FFFFFFFF.

Figure 11:
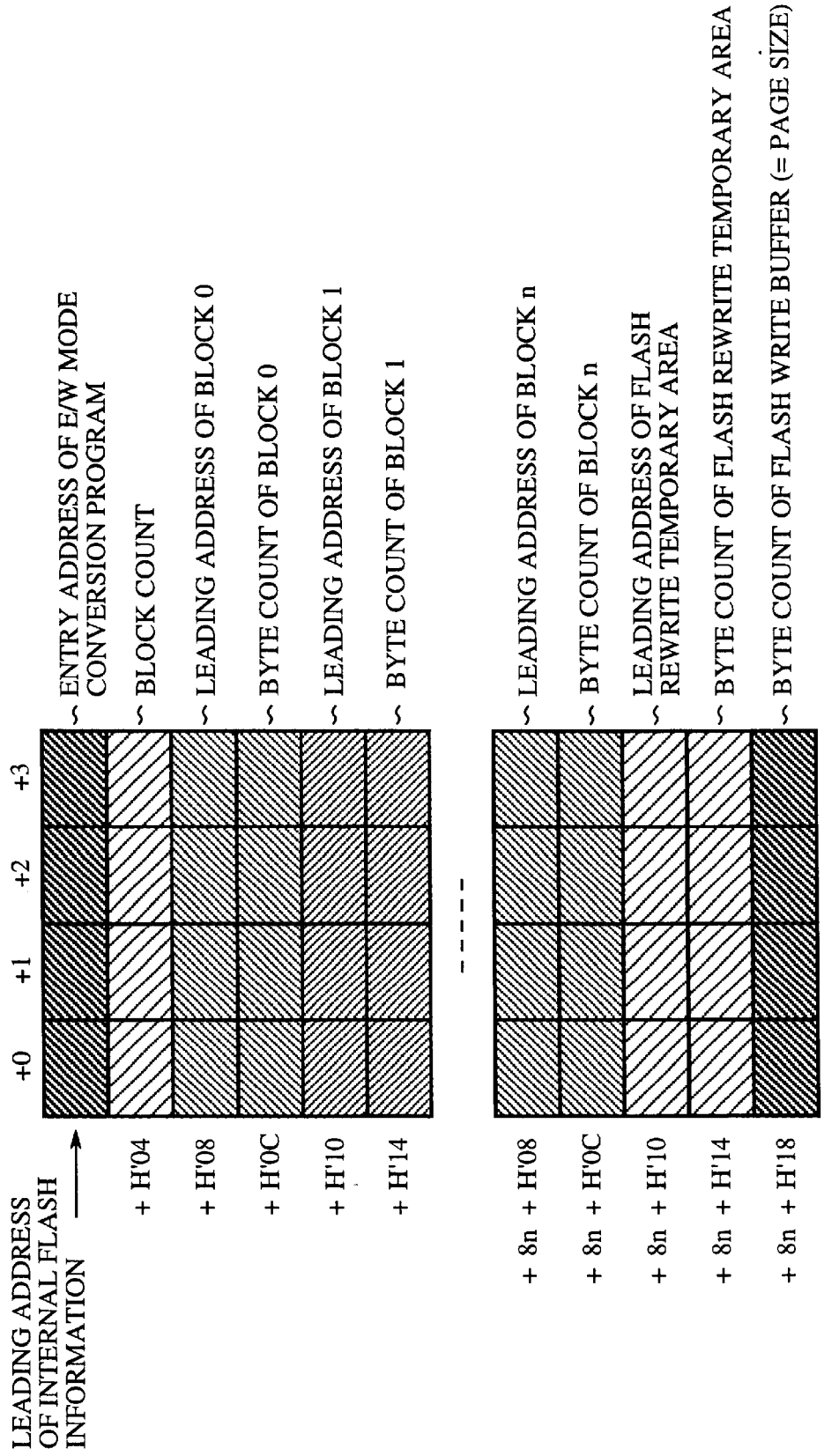
FIG. 11 is a block diagram for illustrating the contents of an area for storing internal-flash information.

FIG. 11 is an explanation diagram that illustrates the organization of an internal flash information storage area. As shown in the figure, the first flash information storage area 26 is placed on the leading addresses HTFF003FE8-EB of the tool ROM area 24. In addition, the following information is placed on the internal flash information storage area 26.
Entry Addresses of E/W Mode Conversion Program (Rewrite Program Information)

The leading addresses +H'00 to H'03: entry addresses of E/W mode conversion program block counts in the internal flash.

The leading addresses +H'04 to H'07: block counts in the internal flash

Each of block information

The leading addresses +H'08 to H'0B: the leading addresses of block 0

H'0C to H'0F: the number of bytes of block 0

H'10 to H'13: the leading addresses of block 1

H'14 to H'17: the number of bytes of block 1

...

8n+H'08 to H' OB: the leading addresses of block n.

8n+H'0C to H'0F: the number of bytes of block n.

(Note) Block Count=n+1

Information About a Temporary Area to be Used at the Time of Rewriting the Internal Flash Part of the internal SRAM 6 is used for storing the flash rewrite program and buffering write data at the time of rewriting the internal flash-memory 5. The leading addresses and the byte count of an area to be temporarily used at the time of rewriting the internal flash-memory 5 are stored.

If the internal flash-memory 5 is rewritten during the debug operation, the information is stored on the side of the debugging tool 2 for providing a way for saving the data of this area from the internal SRAM 6 on the side of the debugging tool 2.

8n+H'10 to H'13: the leading addresses of the temporary area for rewriting data into the flash memory.

8n+H'14 to H'17: byte count of the temporary area for rewriting data into the flash.

(note) block count=n+1

Information about a size (=page size) of flash rewrite buffer

Byte count (=page size) of the flash rewrite buffer is stored

8n+H'18 to H'1B: byte count (=page size) of flash rewrite buffer (note) block count=n+1

Next, we will describe the organization of a program (rewrite program) for rewriting the internal flash. The rewrite program is stored in a boot ROM 42 shown in FIG. 6 and is comprised of the E/W mode conversion program, block-erase program (erase program), page-writing program (writing program), status-ready wait program, the E/W termination program. The organization of each program will be described below.
E/W Mode Conversion Program The E/W conversion program is a program that must be executed at the outset of rewriting the internal flash-memory 5. The program enables a shift to the flash E/W enable mode after setting various parameters in the CPU register to be required for the rewriting operation.
Execution Procedure The monitor-code supply feature 16 branches an address stored in a leading one word of the internal flash information. At this time, there is no need to set the parameters in the MON_PARAM register 35.

Contents of the Process (1) set each parameter in the CPU register

R0: no parameter setting. the debugging tool 2 is available

R1: no parameter setting. the debugging tool 2 is available

R2: no parameter setting. the debugging tool 2 is available

R3: no parameter setting. the debugging tool 2 is available

R4: IFFFF8400 (an address of the MON_DATA register 34)

R5: the leading addresses of flash write buffer −4

R6: no parameter setting. the debugging tool 2 is available

R7: byte count (=page size) of the flash write buffer

R8: an entry address of a block-erase program

R9: an entry address of a page writing program

R10: an entry address of a status-ready wait program

R11: an entry address of an E/W termination program

R12: no parameter setting. the debugging tool 2 is available

R13: no parameter setting. the debugging tool 2 is available

R14: no parameter setting. the debugging tool 2 is available

R15: no parameter setting. the debugging tool 2 is available (2) The flash rewriting program on the internal flash-memory 5 is transferred to the internal SRAM 6.

(3) A shift to the flash E/W enable mode is made.

(4) Program normal/error termination information is written to the MON_DATA register 34.

Procedure for Confirming That the Execution is Completed

The debugging tool 2 verifies the normal completion of the E/W mode conversion program by reading the MON_DATA register 34 and recognizing the value of MSB bit (bit 0).

Block-erase Program

The block-erase program is a program that issues a clear command to a block on the internal flash-memory 5 which is specified by the MON_PARAM register 35. The block-erase program is used in the flash E/W enable mode.

Execution Procedure

The monitor-code supply feature 16 branches an address indicated by the above R8. At this time, the leading addresses of the memory block which is desired to be cleared is set to the MON_PARAM register 35. Information. about the block organization of the internal flash-memory 5 is held in the internal information storage area 26.

Contents of the Process (1) A clear command is issued to a memory block specified by the MON_PARAM register 35.

(2) Before concluding the program, a write operation is executed on the MON_DATA register 34.

Procedure for Confirming That the Program Execution is Completed

The write operation on the MON_DATA register 34 is for handshake between the side of the tool (debugging tool 2) and the side of the device (microcomputer 1). The write to the MON_DATA register 34 indicates the termination of the program. Therefore, the debugging tool 2 firstly reads the contents of the MON_DATA register 34 although such contents are meaningless. Then, the debugging tool 2 executes a subsequent process.

The termination of such a program does not indicate that the erase operation is completed. For confirming that the erase operation is completed, there is a need to execute a "status-ready wait program".

Page-writing Program

A page-writing program is a program that issues a page-writing command to a page specified by the MON_PARAM register 35, which is used in the flash E/W enable mode.

Execution Procedure

The monitor-code supply feature 16 branches an address indicated by the above R9. At this time, the top address of the page which is desired to be written upon is set to the MON_PARAM register 35. In this case, write data is previously transferred to a flash write buffer area on the internal SRAM-6, the leading addresses of the buffer is (R5 value +4) and the buffer size (=page size) is represented by the R7 value. The process can be accomplished by executing the following instruction through the use of the monitor-code supply feature 16.

FFFF9000 LD R0, @(4, R4):

(R4 value +4)=Data on an address of H'FFFF8004 is read out and then stored in R0. That is, the FrontMON_PARAM value (=write data) is read out and assigned to R0.

FFFF9004 ST R0, @+R5:

"4" is added to the value of R5 (i.e., R5 value +4) and then the R0 value is stored on the address represented by the R5 value. That is, the write data read out by the above instruction is transferred to the flash write buffer.

FFFF9006 ADDI R7 #−4:

"4" is subtracted from the value of R7 (i.e, R7 value −4). That is, a size of the write buffer is decremented by one word.

FFFF9008 BNEZ R7, LFFFF9000:

a branch to an address of H'FFFF9000 is caused when the value of R7 is not zero. Alternatively, a shift to an address of H'FFFF900C is caused when the R7 value takes on zero.

That is, a set of statements in the program. executed repeatedly as a loop until the data transmission corresponding to the buffer size is completed.

FFFF900C JMP R8:

a jump to the address indicated by the value of R8 is caused. That is, the flow of execution is jumped to the state ready wait program after terminating the transmission.

FFFF900E NOP

Contents of the Process (1) A write command is issued to a page specified by the MON_PARAM register 35 for the data of flash write buffer.

(2) The values of CPU registers R5 and R7 are set to the following values (the values of R5 and R7 can be used as they are in the step of transferring data to the next buffer).

R5: the leading addresses of the flash writing buffer 4

R7: byte count (=page size) of the flash write buffer (3) Before concluding the program, a write operation is executed on the MON_DATA register 34.

Procedure for Confirming That the Program Execution is Completed

The write operation on the MON_DATA register 34 is for handshake between the side of the tool (debugging tool 2) and the side of the device (microcomputer 1). The write to the MON_DATA register 34 indicates the termination of the program. Therefore, the debugging tool 2 reads the contents of the MON_DATA register 34 at first in spite of such contents are meaningless. Then, the debugging tool 2 executes a subsequent process.

The termination of such a program does not indicate that the erase operation is completed. For confirming that the erase operation is completed, there is a need to execute a "status-ready wait program".

After the termination of the program, the following write data can be written on the flash write buffer.

Status-ready Wait Program

The status-ready wait program is a program for waiting until both erase and writing operations are finished after the executions of both block-clear and page-writing programs. Whether or not to normally complete the erase and writing operations reflects the MON_DATA register 34. The status-ready wait program is used in the flash E/W enable mode.

Execution Procedure

The monitor-code supply feature 16 branches an address indicated by the above R10. There is no need to set the MON_PARAM register 35.

Contents of the Process (1) Wait until the erase or writing operation on the flash is completed.
(2) Program normal/error termination information is written to the MON_DATA register 34.

Procedure for Confirming That the Execution is Completed

The debugging tool 2 reads out the MON_DATA register 34 and verifies the value of MSB bit (bit 0) to confirm whether the erase or writing operation is normally executed.

E/W Mode Termination Program

The E/W mode termination program is a program for returning from the flash E/W enable mode to the normal mode. This program is executed just before the conclusion of the internal flash rewriting process.

Execution Procedure

The monitorcode supply feature 16 branches an address indicated by the above R11. There is no need to set the MON_PARAM register 35.

Contents of the Process (1) A shift to the normal mode is occurred.
(2) Before concluding the program, a write operation is executed on the MON_DATA register 34.

Procedure for Confirming That the Program Execution is Completed

The write operation on the MON_DATA register 34 is for handshake between the side of the tool (debugging tool 2) and the side of the device (microcomputer 1). The write to the MON_DATA register 34 indicates the termination of the program. Therefore, the debugging tool 2 firstly reads the contents of the MON_DATA register 34 although such contents are meaningless. Then, the debugging tool 2 executes a subsequent process.

Hereinafter, we will describe each operation in detail.

1. Operations of Monitor-code Supply Feature and JTAG Control Unit

Figure 12:
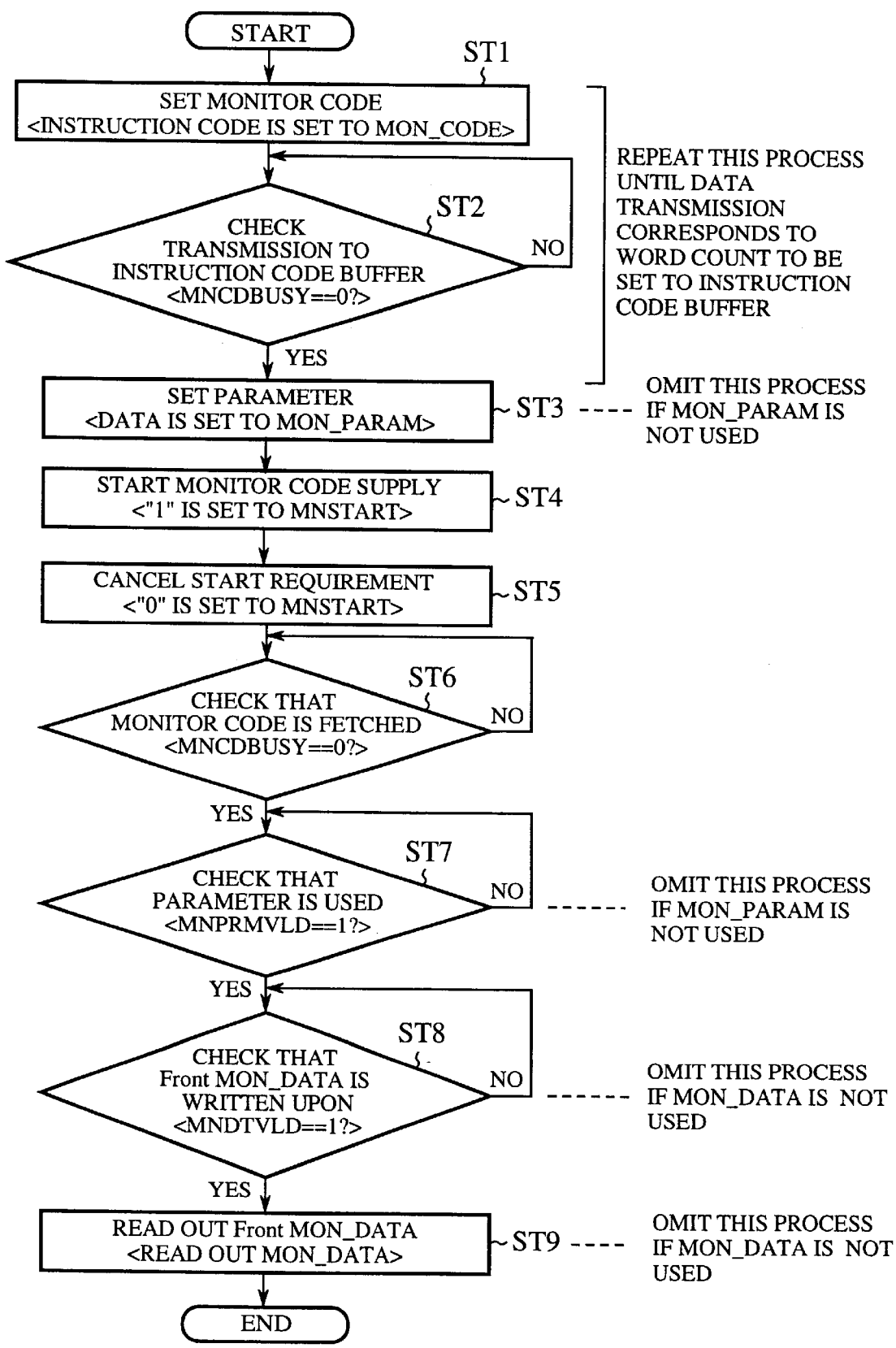
FIG. 12 is a flow chart for illustrating the operations of both the JTAG control unit and the monitor-code supplying facility in the microcomputer.

FIG. 12 is a flow chart for explaining the operations of the monitor-code supply feature and the JTAG control unit. First, we will describe the operations of them with reference to the organization of the microcomputer 1 shown in FIG. 5 and the flow chart of FIG. 12.

(1) Monitor Code Setting

The debugging tool 2 sets an instruction code to the MON_CODE register 33 through the JTAG interface terminals 11. The instruction code in the MON_CODE register 33 is transferred to the instruction code buffer 37. Simultaneously, "1" is set to a MNCDBUSY bit of the MON_ACCESS register 36 and then "0" is set by completing the transfer. An input pointer internally controls the location of the instruction codes corresponding to one word in the instruction code buffer 37. The instruction codes is stored into the buffers #0–#3 in the order in which the codes set. Variables of the input pointer is cleared to zero by resetting the debugging module or setting "1" to the MNSTART bit (ST1).

(2) Verification that the Instruction Code is Transferred to the Instruction Code Buffer The debugging tool 2 verifies that "0" is set to the MNCDBUSY byte by reading out the MON_ACCESS register 36. If "0" is set to the MNCDBUSY bit, it is indicated that the instruction code assigned to the MON_CODE register 33 is transferred to the instruction code buffer 37. A subsequent setting of the instruction code to the MON_CODE register 33 is performed after confirming that "0" is set to the MNCDBUSY bit (ST2).

The above steps (ST1 and ST2) are repeated a given number of times (four times at the maximum).

The instruction code buffer 37 retains the instruction code as long as there is no access on the MON_CODE register 33. Thus, there is no need to perform the setting over and over again if the instruction code being set to the instruction code buffer 37 is used repeatedly. By setting "1" to the MNSTART bit, the CPU3 re-executes the instruction code being held in the instruction code buffer 37.

(3) Parameter Setting

There is no need to perform the present process if the monitor program does not require parameters.

The debugging tool 2 sets parameters to the MON_PARAM register 35 through the JTAG interface terminals 11. The parameters set to the MON_PARAM register 35 is transferred to the FrontMON_PARAM register 39 concurrently with the setting "1" to the MNPRMVLD bit of the MON_ACCESS register 36. If the CPU3 reads data from the FrontMON_PARAM register 39, "0" is set to the MNPRMVL bit. The contents of the FrontMON_PARAM register 39 are held until the setting of the MON_PARAM register 35 is performed. There is no need to perform the setting over and over again if the same parameters are used repeatedly (ST3).

(4) Starting the Supply of Monitor Codes

The debugging tool 2 sets "1" to the MNSTART bit of the MON_ACCESS register 36 through the JTAG interface terminals 11. The setting "1" to the MNSTART bit allows that the CPU 3 fetches the contents of the instruction code buffer 37 (ST4).

(5) Cancel the Start Request

The debugging tool 2 sets "0" to the MNSTART bit of the MON_ACCESS register 36.

(6) Verification That the Monitor Code is Fetched

The debugging tool 2 reads the MON_ACCESS register 36 to confirm that "0" is set to the MNCDBUSY bit If "0" is set to the MNCDBUSY bit, it is indicated that fetching all instructions from the instruction code buffer 37 is completed.

(7) Verification That the MON_PARAM is Used

This process is required only when the parameters are specified.

The debugging tool 2 reads the MON_ACCESS register 36 to confirm that "0" is set to the MNDTVLD bit. If "0" is set to the MNDTVLD bit, it is indicated that the CPU 3 reads the FrontMON_PARAM register 38.

(8) Verification That the FrontMON_DATA Register 38 is Written Upon

This process is required only when the monitor program executes a writing operation on the FrontMON_DATA register 38.

The debugging tool 2 reads the MON_ACCESS register 36 to confirm that "1" is set to the MNPRMVLD bit. If "1"

is set to the MNPRMVLD bit, it is indicated that the CPU 3 writes data on the FrontMON_DATA register 39.

(9) Read out the FrontMON_DATA

This process is required when the monitor program executes a writing operation on the FrontMON_DATA 38.

MNDTVLD bit is automatically cleared when the debugging tool 2 reads the MON_DATA register 34 through the JTAG interface terminal 11. The contents of the FrontMON_DATA register 38 is retained as long as the write operation is performed on the FrontMON_DATA register 38 (ST9).

2. Rewrite Operation on Internal Flash-memory

Figure 13:
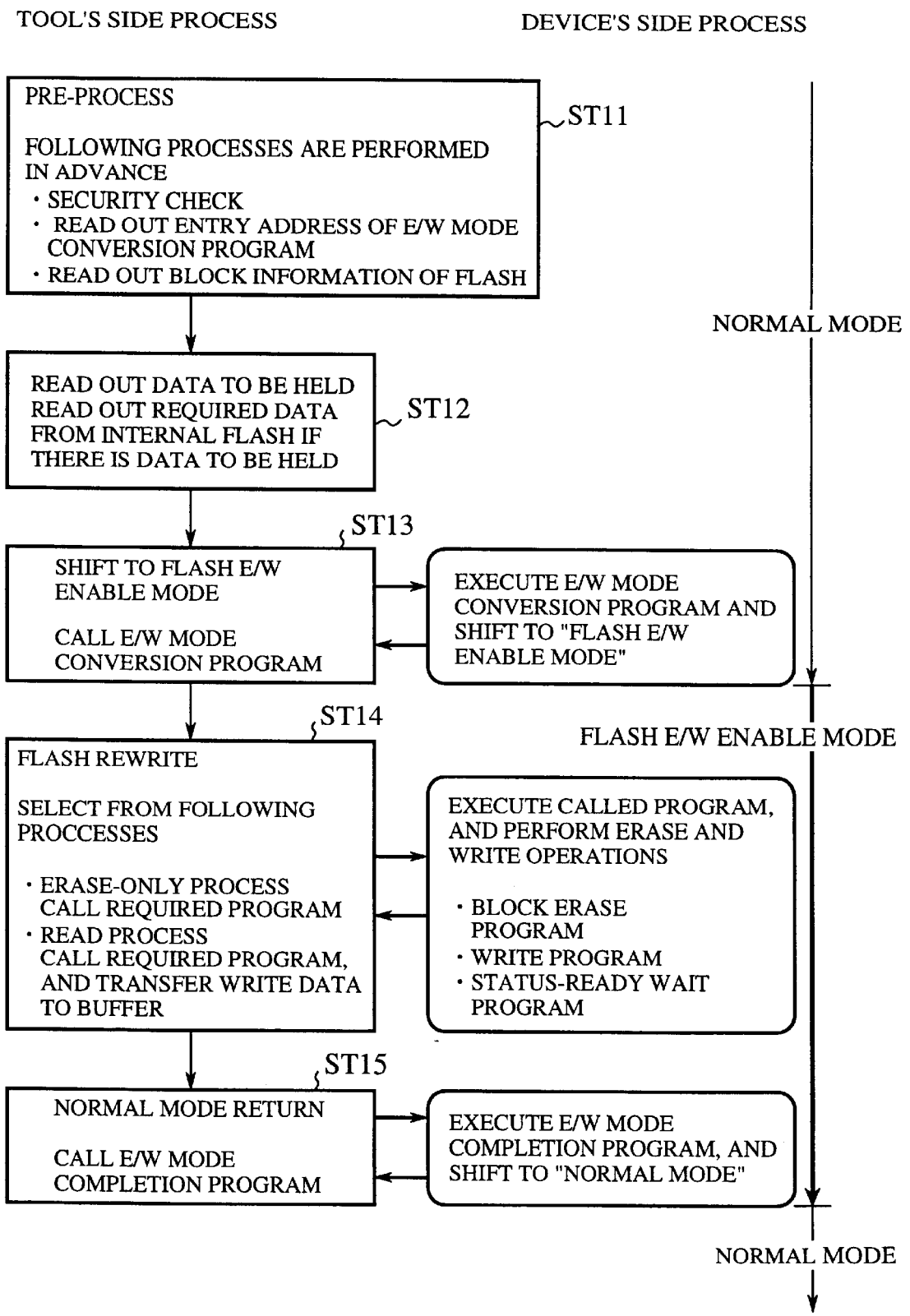
FIG. 13 is a flow chart for illustrating the outline of an operation for rewriting the contents of the internal flush memory.

FIG. 13 is a flow chart for explaining the general outlines of a rewrite operationon the internal flash-memory. Referring now to FIG. 13, we will explain the general outlines of a rewrite operation on the internal flash-memory.

The JTAG control unit 15 and the monitor supply feature 16 shown in FIG. 5 is used to invoke a rewrite program stored in the boot ROM area 42 in the internal flash-memory 5 shown in FIG. 6. The rewrite program executes rewrite of the internal flash-memory 5. The transfer of write data from the debugging tool 2 is also performed using the MON_PARAM register 35 of the JTAG control unit 15.

Pre-process (ST11)

There is a necessity to manipulate the debugging tool before the process of rewriting the internal flash-memory. The following comprises the contents of the pre-process:

the security level is checked;

the information about the block organization of the internal flash-memory is read out; and an entry address of the E/W mode conversion program is read out.

Read-out Data to be Held (ST12)

The writing to the internal flash-memory 5 involves the erase on a block-by-block basis. If there is data that must be held in the block to be written, there is a necessity to read out the data before being placed in the flash E/W enable mode.

Shift to Flash E/W Enable Mode (ST13)

The execution of the E/W mode conversion program allows a shift from the normal mode to the flash E/W enable mode.

Rewrite Flash Memory (ST14)

Different processes are applied on the erasing and writing operations, respectively. In each of the processes, a desired program is executed.

Block-delete program

Page-write program, and

Status-ready program

Return to Normal Mode (ST15)

The E/W mode termination program is executed for attaining a return from the flash E/W enable mode to the normal mode.

Next, we will describe the details of the pre-process (ST11) and the reading of data to be held (ST12) shown in FIG. 13. Once the debugging tool 2 is activated, various kinds of information in the microcomputer 1 is read out using the JTAG control unit 15 and the monitor-code supply feature 16 to check the security code.

(1) Reading of Tool-ROM Setting Verification Code

① An instruction code from the debugging tool 2 is set to the MON_CODE register 33 through the JTAG interface terminals 11 shown in FIG. 5.

② The instruction code set to the MON_CODE register 33 is transferred to the instruction code buffer 37 using the functions of the JTAG control unit 15 and the monitor-code supply feature 16.

Following the execution of above processes ① and ② four times, a program for reading a tool-ROM setting verification code and writing the code to the FrontMON_DATA register 38 is set to the instruction code buffer 37.

③ "1" is set to the MNSTART bit of the MON_ACCESS register 36 from the debugging tool 2 through the JTAG interface terminals 11 shown in FIG. 5.

④ The CPU 3 shown in FIG. 5 executes a read program for reading the tool-ROM setting verification code transferred from the instruction code buffer 37, including the steps of:

reading an address of H'FF003FFC of the tool ROM area shown in FIG. 10;

writing the read data to the FrontMON_DATA register 38 (address H'FFFF8000); and branching to the address H'FFFF9000 to wait an instruction code to be supplied from the next debugging tool 2.

⑤ Data written in the FrontMON_DATA register 38 is transferred to the MON_DATA register 34 using the functions of the JTAG control unit 15 and the monitor-code supply feature 16.

⑥ Data of the MON_DATA register 34 is read by the debugging tool 2 through the JTAG interface terminals 11.

⑦ In the debugging tool 2, the process proceeds in one of the following steps depending on the data of the MON_DATA register.

If the data is of the address H'DF534449, the process proceeds in the next process (2).

If the data is of an address other than H'DF534449, the process for reading tool-ROM-is completed.

(2) Reading of a Security Code

① Reading of the Leading Addresses of the Security-code Storage Area

A reading address is changed to an address H'FF003FF4 of the tool ROM area and then executes the same steps as those of ① to ⑥ in the process (1), reading out "the leading addresses of the security-code storage area".

② Reading of a Security Code's Byte Count and a Security Level

A reading address is changed to an address H'FF003FF0 of the tool ROM area and then executes the same steps as those of ① to ⑥ in the process (1), reading out "the security code's byte count and the security level" shown in FIG. 10.

③ Reading of a Security Code

A reading address is changed to the leading addresses of the security-code storage area and then executes the same steps as those of ① to ⑥ in the process (1), reading out "the security code".

If a byte count of the security code exceeds 4 bytes, all of the security codes can be obtained by repeating the same steps as those of ① to ⑥ in the process (1).

④ Security Code Check

The debugging tool 2 requires the user who uses the debugging tool 2 to enter a security code by typing on the keyboard.

The debugging tool 2 compares the input value with the value obtained in the step ③ to determine if there is a match. Depending on a combination of the comparison and the security level obtained by the step ②, the process proceeds to one of the following steps.

If the input value matches the value obtained in the step ③, the process proceeds to the next process (3).

If the security level takes on "0" in addition to a mismatch between the above input valued and the value obtained in the step ③, the debugging tool does not permit all operations except a reset of the debugging tool 2.

If the input value and the value obtained in the step ③ are not identical and also the security level takes on "1", the debugging tool does not permit all operations until the user clears all areas of the internal flash-memory 5.

The security check described above allows protection of data and programs in the internal flash-memory from write or erase which can be easily caused through the actions of outsiders.

(3) Reading of Internal Flash Information

① Reading of the Leading Addresses of the Internal Flash Information Storage Area A reading address is changed to the address H'FF003FE8 of the tool ROM area and then executes the same steps as those of ① to ⑥ in the process (1), reading out "the leading addresses of the internal flash information storage area" shown in FIG. 10.

② Reading of an Entry Address of E/W Mode Conversion Program

A reading address is changed to the leading addresses of the internal flash information storage area and then executes the same steps as those of ① to ⑥ in the process (1), reading out "an entry address of the E/W mode conversion program" shown in FIG. 11.

③ Reading of a Block Count

A reading address is changed to an address obtained by adding 4 to the leading addresses of the internal flash information storage area (i.e., the leading addresses +4) and then executes the same steps as those of ① to ⑥ in the process (1), reading out "a block count".

④ Reading of the Leading Addresses and a Byte Count of Each Block

A reading address is changed to an address obtained by adding 8 to the leading addresses of the internal flash information storage area (i.e., the leading addresses +8) and then executes the same steps as those of ① to ⑥ in the process (1), reading out "the leading addresses of block 0". Then, the same steps as those of ① to ⑥ in the process (1) are executed with increasing the numerical value of the reading address in increments of 4, reading out "the leading addresses and the byte count of each block" shown in FIG. 11.

Addresses of the area to be read can be calculated using the block count obtained in the step ③. That is, the addresses are from [the leading addresses obtained in the step ① +8] to [the leading addresses obtained in the step ① +8×n+H'0C)] wherein n=(block count obtained in the step ③ −1). ⑤ Reading of a Flash-rewrite Temporary Area A reading address is changed to an address obtained by adding (8×n+H'10) to the leading addresses of the internal flash information storage area (i.e., the leading addresses+ (8×n+H'10)) and then executes the same steps as those of ① to ⑥ in the process (1), reading out "the leading addresses of the flash-rewrite temporary area" shown in FIG. 11.

The reading address is changed to the leading addresses of the internal flash information storage area obtained in the above step ①+(8×n+H'10) and then executes the same steps as those of ① to ⑥ in the process (1), reading out "the byte count of the flash-rewrite temporary area" shown in FIG. 11.

For the erase and write operations on the internal flash-memory 5, a part of the internal SRAM 6 is used for storing a flash-rewrite program and buffering write data and is called a flash-rewrite temporary area. This area is one to be used by the user involved in a debug operation. Thus, it is required that the debugging tool 2 saves the data stored in the internal SRAM 6 being used by the user in advance of erase and write operations on the internal flash-memory 5. The debugging tool 2 performs a save operation using the data of the flash-rewrite temporary area obtained in the step ⑤ and then performs a restore operation after erase and write operations on the internal flash-memory 5.

⑥ Reading of a Byte Count of the Flash-write Buffer

A reading address is changed to an address obtained by adding (8×n+H'18) to the leading addresses of the internal flash information storage area obtained in the step ① (i.e., the leading addresses+(8×n+H'18)) and then executes the same steps as those of ① to ⑥ in the process (1), reading out "the byte count of the flash-write buffer" shown in FIG. 11.

The flash write buffer is a buffer area where write data in the flash-rewrite temporary area is stored. If a write operation is down on the internal flash memory 5, there is a need to control the debugging tool 2 so that a write operation is looped with respect to each page-size. In this case, however, the microcomputer may provide different page sizes, so that the write data is generated using the information about a page size obtained by the step ⑥.

Figure 14:
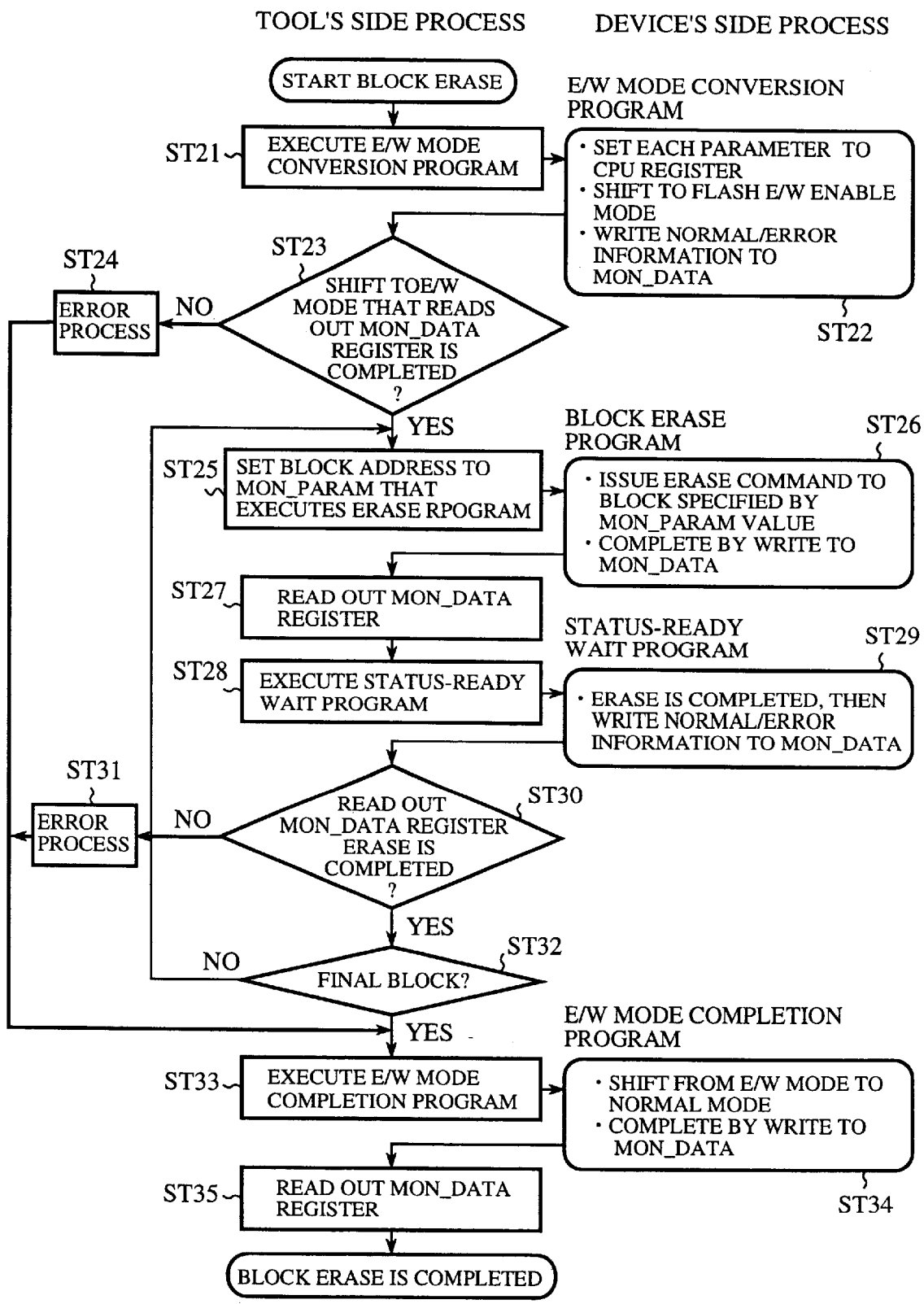
FIG. 14 is a flow chart for illustrating the outline of an operation for erasing the contents of the internal flash-memory.

FIG. 14 is a flow chart that illustrates an erase operation of the internal flash-memory. We will describe the erase operation of the internal flash-memory with reference to the flow chart shown in FIG. 14. By the way, the flow chart of FIG. 14 corresponds to the details in which an erase operation of the internal flash-memory 5 is performed alone in the steps of shifting to the flash EIW enable mode (ST 13), rewriting the flash-memory (ST 14), and restoring the normal mode (ST 15) shown in FIG. 13.

(4) Execution of E/W Mode Conversion Program (Means for Executing E/W Mode Conversion Program)

① An instruction code for a branch to E/W mode conversion program is set to the MON_CODE register 33 from the debugging tool 2 through the JTAG interface terminals 11 shown in FIG. 5 (ST 21).

② The instruction code set to the MON_CODE resister 33 is transferred to the instruction code buffer 37 using the functions of the JTAG control unit 15 and the monitor-code supply feature 16 (ST 22).

③ "1" is set to the MNSTART bit of the MON_ACCESS register 36 from the debugging tool 2 through the JTAG interface terminals 11 shown in FIG. 5 (ST 21).

④ The CPU 3 shown in FIG. 5 executes the instruction code for the branch to the E/W mode shift program transferred to the instruction code buffer 37, resulting in a branch to the E/W mode conversion program located on the boot ROM area 42 shown in FIG. 6 (ST 21).

⑤ The CPU 3 executes the E/W mode conversion program to perform the following process (ST 22).

Parameters are set to the corresponding registers of the CPU 3, respectively (The process contents of the E/W mode conversion program: see R0 to R15).

Rewrite programs (i.e., E/W mode conversion program, block erase program, page-writing program, status-ready wait program, and E/W termination program) on the boot ROM 42 shown in FIG. 6 are transferred to the internal SRAM 6 shown in FIG. 1. This transmission of the rewrite programs from the boot ROM area 42 in the internal flash-memory 5 to the internal SRAM 6 is for saving the flash rewrite program on the internal SRAM 6 because a read operation from the internal flash memory 5 cannot be performed when a shift to the flash E/W mode is occurred.

A branch to the internal SRAM 6 leads to the execution of the following process.

"1" is set to the FENTRY bit 62 of the flash-memory control register 61 shown in FIG. 8, resulting in a shift of the internal flash-memory 5 to the flash E/W enable mode.

An address H00000000 is written to the FrontMON_DATA register 38 (H'FFFF8000) shown in FIG. 5.

A branch to an address H'FFFF9000, and then wait for the instruction code to be supplied from the next debugging tool 2.

⑥ Data written in the FrontMON_DATA register 38 is transferred to the MON_DATA register 34 through the use of the functions of the JTAG control unit 15 and the monitor-code supply feature 16. Simultaneously, "1" is set to the MNDTVLD bit of the MON_ACCESS register 36 (ST 22).

⑦ The debugging tool 2 reads the MON_ACCESS register 36 though the JTAG interface terminals 11 to check the MNDTVLD bit. If the bit takes on "1", a value of the MON_DATA register 34 is read out through the JTAG interface terminals 11. If a bit 0 value of the read data takes on "0", a shift to the execution of the next block erase program occurs. If the bit 0 value takes on "1", an error handling (ST 24) is performed (ST 23).

(5) Execution of a Block Erase Program (Means for Executing a Erase Program)

① An adress corresponding to a block of the internal flash-memory 5 to be deleted is set to the MON_PARAM register 35 from the debugging tool 2 through the JTAG interface terminal 11 (ST 25).

② The address set to the MON_PARAM register 35 is transferred to the FrontMON_PARAM register using the functions of the JTAG control unit 15 and the monitor-code supply feature 16 (ST 26).

③ An instruction code for a branch to a block erase program is set to the MON_CODE register 33 from the debugging tool 2 through the JTAG interface terminals 11 (ST25).

④ "1" is set to the MNSTART bit of the MON_ACCESS register 36 from the debugging tool 2 through the JTAG interface terminals 11 (ST 25).

⑤ The CPU 3 executes the instruction code for a branch to the block erase program transferred to the instruction code buffer 37, resulting in a branch to the block erase program being saved on the internal SRAM 6 (ST 26).

⑥ The CPU 3 executes the block erase program and performs the following process (ST 26).

The FrontMON_PARAM register 39 (address H'FFFF8004) is read out.

A clear command is issued to the internal flash-memory 5.

FIG. 15 is a flow chart that illustrates an erase operation of the internal flash-memory. Referring now to the flow chart, we will describe the operation depending on the above erase program.

First, a block-erase command data (H'2020) is written to any address of the internal flash-memory 5 (ST 41). Then, a validation command data (H'D0D0) is written to the final even-numbered address of the target block to be cleared which is read out from the FrontON_PARAM register 39 (ST 42). Therefore, the erase of the block to be cleared is initiated by the flash internal control circuit 5c shown in FIG. 1 (ST 43).

Address H'00000000 is written to the FrontMON_DATA register 38 (address H'FFF8000).

Branching to an address H'FFFF9000 and waiting an instruction code to be supplied from the next debugging tool 2.

⑦ Using the functions of the JTAG control unit 15 and the monitor-code supply feature 16, data written to the FrontMON_DATA register 38 is transferred to the MON_DATA register 34 and the MNDTVLD bit of the MON_ACCESS register 36 is set to "1" (ST 26).

⑧ The debugging tool 2 reads the MON_ACCESS register 36 through the JTAG interface terminals 11 to check the MNDTVLD bit. If the MNDTVLD bit takes on "1", the debugging tool 2 reads the data of the MON_DATA register 34 through the JTAG interface terminals 11 (ST 27).

(6) Execution of a Status-ready Wait Program (Means for Executing a Status-ready Wait Program)

① An instruction code for a branch to a status-ready wait program is set to the MON_CODE register 33 from the debugging tool 2 through the JTAG interface terminal 11 (ST 28).

② An instruction code set to the MON_CODE register 33 is transferred to the instruction code buffer 37 through the use of the functions of the JTAG control unit 15 and the monitor-code supply feature 16 (ST 29).

③ "1" is set to the MNSTART bit of the MON_ACCESS register 36 from the debugging tool 2 through the JTAG interface terminals 11 (ST 28).

④ The CPU 3 executes the instruction code for a branch to the status-ready wait program being transferred to the instruction code buffer 37 (ST 29).

⑤ The CPU 3 executes the status-ready program and performs the following process (ST 29).

The flash ready-status register 51 shown in FIG. 7 is read out to check the FSTAT bit. If the FSTAT bit takes on "1", an address of H'00000000 is written to the FrontMON_DATA register 38 (address H'FFFF8000). If the FSTAT bit does not take on "1" within a fixed time period, the address H'80000000 is written to the FrontMON_DATA register (address H'FFFF8000).

⑥ The data written to the FrontON_DATA register 38 is transferred to the MON_DATA register 34 using the functions of the JTAG control unit 15 and the monitor-code supply feature 16. Simultaneously, the MNDTVLD bit of the MON_ACCESS register 36 is set to "1" (ST 29).

⑦ The debugging tool 2 reads out the MON_ACCESS register 36 through the JTAG interface terminals 11 to check the MNDTVLD bit. If the MNDTVLD bit takes on "1", the debugging tool 2 reads the data of the MON_DATA register 34 through the JTAG interface terminals 11. If a bit 0 value of the read data takes on "0", the process proceeds to the execution of the next step ⑧. If the bit 0 value takes on "1", an error handling (ST 31) is performed (ST 30).

⑧ The debugging tool 2 repeats the above steps (ST 25 to ST 30) only the number of blocks to be cleared (ST 32).

(7) Execution of E/W Mode Termination Program (Means for Executing an E/W Mode Termination Program)

① An instruction code for a branch to an E/W mode termination program is set to the MON_CODE register 33 from the debugging tool 2 through the JTAG interface terminal 11 (ST 33).

② The instruction code set to the MON_CODE register 33 is transferred to the instruction code buffer 37 using the functions of the JTAG control unit 15 and the monitor-code supply feature 16 (ST 34).

③ "1" is set to the MNSTART bit of the MON_ACCESS register 36 from the debugging tool 12 through the JTAG interface terminal 11 (ST 33).

④ The CPU 3 executes the instruction code for the branch to the E/W mode termination program being transferred to the instruction code buffer 37, resulting in a branch to the E/W mode termination program being saved on the internal SRAM 6 (ST 34).

⑤ The CPU 3 executes the E/W mode termination program and performs the following process (ST 34).

"0" is written to the FENTRY bit 62 of the flash-memory control register 61 shown in FIG. 8 for shifting the internal flash-memory 5 to the normal mode.

An address H'00000000 is written to the FrontMON_DATA register 38 (H'FFFF8000).

⑥ Using the functions of the JTAG control unit 15 and the monitor-code supply feature 16, the data written to the FrontMON_DATA register 38 is transferred to the MON_DATA register 34. Simultaneously, "1" is set to the MNDTVLD bit of the MON_ACCESS register 36 (ST 34).

⑦ The debugging tool 2 reads the MON_ACCE register 36 through the JTAG interface terminals 11 to check the MNDTVLD bit. If the MNDTVLD bit takes on "1", the data of the MON_DATA register 34 is read out through the JTAG interface terminal 11 (ST 35).

Figure 16:
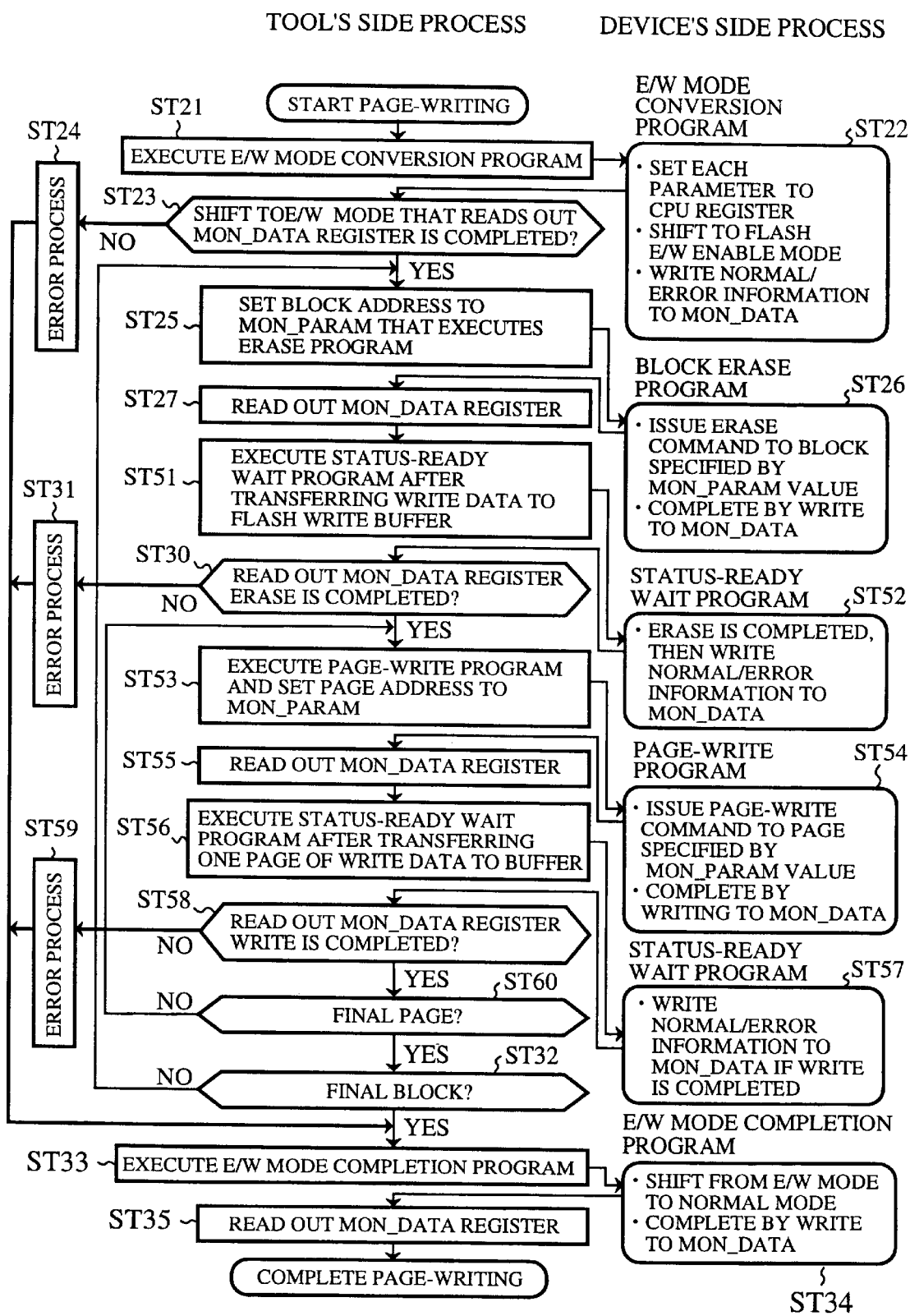
FIG. 16 is a flow chart for illustrating the outline of an operation for rewriting the contents of the internal flush memory.

FIG. 16 is a flow chart that illustrates a write operation of the internal flash-memory. Referring now to the flow chart of FIG. 16, we will describe the write operation of the internal flash-memory 5 in detail.

By the way, the flow chart of FIG. 16 corresponds to the details in which an erase operation of the internal flash-memory 5 is performed alone in the steps of shifting to the flash E/W enable mode (ST 13), rewriting the flash-memory (ST 14), and restoring the normal mode (ST 15) shown in FIG. 13.

(4) Execution of E/W Mode Conversion Program (Means for Executing an E/W Mode Conversion Program)

This operation corresponds with the steps (ST 21 to ST 24) of the erase operation of the internal flash-memory 5 shown in FIG. 14.

(5) Execution of a Block Erase Program (Means for Executing a Block Erase Program)

This operation corresponds with the steps (ST 25 to ST 27) of the erase operation of the internal flash-memory 5 shown in FIG. 14.

(6) Write Data Transfer to the Internal Flash-memory

Principally, after the step ST 27, the termination of the erase operation should be verified by executing the status-ready wait program. Making use of the time to be required to erase, alternatively, the write data written in the internal flash-memory 5 is transferred to the flash write buffer on the internal SRAM 6. This operation will be described below.

① The instruction code of the write data transfer program is set to the MON_CODE register 33 from the debugging tool 2 through the JTAG interface terminal 11 (ST 51).

② The instruction code set to the MON_CODE register 33 is transferred to the instruction code buffer 37 using the functions of the JTAG control unit 15 and the monitor-code supply feature 16 (ST 52).

Repeating the above process ①② four times, the write data transfer program is set to the instruction code buffer 37. The write data transfer program is a program for transferring the data desirable to be written to the internal flash-memory from the debugging tool 2 to the flash write buffer on the internal SRAM 6 (cf. the execution method of the page-writing program of the organization).

③ 32 bits of data is set to the MON_PARAM register 35 from the debugging tool 2 through the JTAG interface terminals 11 (ST 51).

④ The write data set to the MON_PARAM register 35 is transferred to the FrontMON_PARAM register 39 using the functions of the JTAG control 15 and the monitor-code supply feature 16 (ST 52).

⑤ "1" is set to the MNSTART bit of the MON_ACCEESS register 36 from the debugging tool 2 through the JTAG interface terminal 11 (ST 51).

⑥ The CPU 3 executes the write data transfer program set to the instruction code buffer 37 and performs the following process (ST 52).

the FrontMON_PARAM register 39 (address H'FFFF8004) is read out.

The write data which is read out is written to the flash write buffer on the internal SRAM 6.

The address of the writing destination is incremented by +4.

A branch to the address H'FFFF9000 is caused and the supply of an additional instruction code is waited for.

The steps ③ to ⑥ are executed repeatedly as a loop so that1 page (=256 bytes) of write data is transferred to the flash write buffer on the internal SRAM 6. The process at the last loop allows a branch to the status-ready wait program at last.

(7) Execution of Status-ready Wait Program (Means for Executing a Status-ready Wait Program)

This operation corresponds with the steps (ST 28 to ST 31) of the erase operation of the internal flash-memory 5 shown in FIG. 14.

(8) Execution of Page-write Program (Means for Executing a Write Program)

① An address of the write destination is set to the MON_PARAM register 35 from the debugging tool 2 through the JTAG interface terminals 11 (ST 53).

② The address set to the MON_PARAM register 35 is transferred to the FrontMON_PARAM register 39 using the finctions of the JTAG control unit 15 and the monitor code feature 16 (ST 54).

③ An instruction code for a branch to a page-write program is set to the MON_CODE register 33 from the debugging tool 2 through the interface terminals 11 (ST 53).

④ " 1" is set to the MNSTART bit of the MON_ACCESS register 36 from the debugging tool 2 through the JTAG interface terminals 11 (ST 53).

⑤ The CPU 3 executes the instruction code to be branched to the page-write program transferred to the instruction code buffer 37, resulting in a branch to the page-write program being saved on the internal SRAM 6 (ST 54).

⑥ The CPU 3 executes the page-write program and performs the following steps (ST 54):

reading out the FrontMON_PARAM register 39 (address HTFFF8004); and issuing a page-write command to the internal flash-memory 5.

FIG. 17 is a flow chart that illustrates the details of a write operation on the internal flash-memory. Referring the flow chart, we will describe the details of a write operation of the internal flash-memory with reference to the page-write command described above.

First, a page-program command data (H'4141) is written to any address of the internal flash-memory 5 (ST 81). Then, the first 16 bits of data of the flash write buffer are read out and written to the internal flash-memory 5 using a value retrieved from the FrontMON_PARAM register 39 as the write destination address (ST 82). The destination address for reading the flash write buffer and the destination address for writing on the flash-memory are incremented by +2 respectively (ST 83), concurrently with executing a write operation corresponding to one page (=256 bytes) of data (ST 82 to ST 84). If one page of the write operation is completed, the flash internal control unit 5c permits the writing of one page of data to the internal flash memory 5 (ST 85). An address of H'00000000 is written to the FrontMON-DATA register 38 (address H'FFFF8000).

Then, a branch to the address H'FFFF9000 is caused to wait an instruction code to be supplied from the next debugging tool 2.

(7) Using the functions of the JTAG control unit 15 and the monitor-code supply feature 16, the data written to the FrontMON_DATA register 38 is transferred to the MON_DATA register 34 in conjunction with setting the MNDTVLD bit of the MON_ACCESS register 36 to "1" (ST 54)

(8) The debugging tool 2 reads out the MON_ACCESS register 36 through the JTAG interface terminal 11 to check to the MNDTVLF bit. If it takes on "1", the debugging tool 2 reads out a value of the MON_DATA register 34 through the JTAG interface terminals 11 (ST 55).

(9) Write Data Transfer to the Internal Flash-memory

This operation is performed by the same way as that of the process (6) for transferring write data to the internal flash-memory (ST 56).

(10) Execution of Status-ready Wait Program (Means for Executing a Status-ready Wait Program)

This operation is performed by the same way as that of the process (7) for executing the status-ready wait program (ST 56 to ST 59).

A series of the steps (ST 53 to ST 58) is repeated by the required pages (ST 60), and also a series of the steps (ST 25 to ST 60) is repeated by the required blocks (ST 32).

(11) Execution of E/W Mode Termination Program (Means for Executing an E/W Mode Termination Program)

This operation is performed by the same way as that of the erase operation (ST 33 to ST 35) of the internal flash memory 5 shown in FIG. 14.

In the first embodiment described above, as shown in FIG. 9, the tool ROM area 24 and the rewrite program are held in the boot ROM area 42 in the internal flash-memory 5, and also the security-code storage area 25 and the internal flash information storage area 26 are held in any space. However, these areas may be placed in any area provided as a space that can be accessed by the CPU 3. It is advantageous to place these areas in on the internal flash-memory 5 because information can be written or rewritten even after making a chip of the microcomputer 1.

The rewrite program may be stored in the mask ROM instead of the internal flash-memory 5. In this case, there is no need to save the data on the internal SRAM 6 at the time of rewriting the internal flash-memory 5, resulting in a simple processing.

In the first embodiment described above, we make a distinction among information in the tool ROM area 24, information in the security-code storage area 25, and information in the internal flash information storage area 25. However, all the information may be combined and provided as a piece of internal flash information.

According to the first embodiment, therefore, a rewrite operation of the internal flash-memory 5 can be directly controlled from the debugging tool 2, so that a microcomputer that allows an increase in the efficiency of a debug operation can be obtained.

According to the present invention, as described above, a microcomputer comprises: a first storage means that stores a program for rewriting of an internal flash memory; a second storage means that stores internal flash information about the internal flash memory; an interface that makes a connection to a debugging tool; and a CPU, wherein the CPU allows reading of the internal flash information by the debugging tool through the interface, receiving of write data based on the internal flash information from the debugging tool through the interface, and rewriting of the write data as new contents into the internal flash memory in accordance with the program for rewriting of the internal flash memory. Therefore, the configuration of the present microcomputer has the advantage that the debugging tool is able to use the rewrite program stored in the microcomputer at the time of debugging to control a rewriting operation on the internal flash memory, resulting in an increase in efficiency of the debugging operation.

Also, the internal flash information can be stored in the microcomputer and read by the debugging tool, so that the debugging tool can prepare write data based on the internal flash information. Therefore, the configuration of the present microcomputer has the advantage that the rewriting operation can be attained using the same debugging tool even when applied to another microcomputer having a different storage capacity and a block organization of the internal flash memory.

Furthermore, the present microcomputer has an interface that allows the rewriting of the internal flash memory by activating the rewrite program by the debugging tool. Therefore, the configuration of the present microcomputer has the advantage that the rewriting operation can be attained using the same debugging tool even when applied to another microcomputer that employs a different technique for rewriting of the internal memory.

According to the present invention, furthermore, the first storage means may be provided in the internal flash memory, so that the program for rewriting of the internal flash memory can be stored in the internal flash memory. Therefore, the configuration of the present microcomputer has the advantage that the rewrite program can be written or rewritten to the microcomputer even after the step of making a memory chip in the microcomputer.

According to the present invention, the program for rewriting of the internal flash memory may comprise an E/W mode conversion program, an erase program, a write program, a status-ready wait program, and an E/W mode completion program. Therefore, the configuration of the present microcomputer has the advantage that the size of the whole rewrite program can be reduced by organizing the rewrite program with divided program modules.

The erase program and the write program may be independent of each other, so that the configuration of the present microcomputer has the advantage that only the erase operation can be performed on the internal flash memory.

According to the present invention, the second storage means may be provided in the internal flash memory, so that the internal flash information can be stored in the internal flash memory. Therefore, the configuration of the present microcomputer has the advantage that the rewrite program can be written or rewritten to the microcomputer even after the step of making a memory chip in the microcomputer.

The internal flash information may include: block information about block sizes and addresses of the internal flash memory; and rewrite program information about the leading addresses of the rewrite program, so that the debugging tool is able to prepare write data with reference to the block information. Therefore, the configuration of the present microcomputer has the advantage that the rewriting operation can be attained using the same debugging tool even when applied to another microcomputer having different storage capacity, block organization, location address, and the like of the internal flash memory.

In addition, the debugging tool reads out a location of storing the rewrite program in the internal flash memory. Thus, the configuration of the present microcomputer has the advantage that the rewriting operation can be attained using the same debugging tool even when applied to another microcomputer having a different location of storing the rewrite program in the internal flash memory.

The internal flash information may include information that indicates a storage location of a security code. Therefore, the configuration of the present microcomputer has the advantage that the debugging tool has a capability of permitting a rewrite operation based on the comparison between a user-entered security code and a security code provided in the internal flash. information.

According to the present invention, the internal flash information may include locations of areas to be used for saving the rewrite program of the internal flash memory and holding the write data temporarily, so that the debugging tool saves the data stored in the temporary storage area. Therefore, the configuration of the present microcomputer has the advantage that the debugging tool prevents troubles before it happens in which the trouble is that the rewrite operation on the internal flash memory erases the contents of the temporary storage area by mistake.

According to the present invention, the internal flash information may include information about a size of the area to be used for holding the write data temporary at the time of rewriting the internal flash memory. Therefore, the configuration of the present microcomputer has the advantage that the debugging tool generates write data based on the size information.

According to the present invention, furthermore, the microcomputer can be configured comprised of: a first storage means that stores a program for rewriting of the internal flash memory; a second storage means that stores internal flash information about the internal flash memory; an interface that makes a connection to a debugging tool; and a CPU, wherein the CPU allows execution of debugging based on an instruction code of a debug program held in a first register by the debugging tool through the serial interface in conjunction with holding internal flash information stored in the second storage means in a second register so that the internal information is readable by the debugging tool through the serial interface, and a rewrite operation in which write data based on the internal flash information held in a third register is written into the internal flash memory in accordance with the program for rewriting of the internal flash memory by the debugging tool through the serial interface. Therefore, the configuration of the present microcomputer has the advantage that the debugging tool is able to directly control a rewrite operation on the internal flash memory at the time of debugging, resulting in an increase in efficiency of the debugging operation.

The internal flash information can be stored in the microcomputer and read out by the debugging tool, so that the debugging tool is able to prepare write data based on the internal flash information. Therefore, the configuration of the present microcomputer has the advantage that the rewriting operation can be attained using the same debugging tool even when applied to another microcomputer having different storage capacity, block organization, and the like of the internal flash memory.

Furthermore, the present microcomputer has an interface that allows the rewriting of the internal flash memory. by activating the rewrite program by the debugging tool. Therefore, the configuration of the present microcomputer has the advantage that the rewriting operation can be attained using the same debugging tool even when applied to another microcomputer that employs a different technique for rewriting of the internal memory.

Furthermore, serial interface may be used as a data transmission scheme, so that there is the advantage that the number of interface terminals connecting between the microcomputer and the debugging tool can be reduced.

Furthermore, the feature for permitting the supply of CPU instructions from the debugging tool can be used in the normal debugging of the microcomputer, so that this feature can be shared between the capabilities of the normal debugging function and the rewrite function of the internal flash memory. Therefore, the configuration of the present microcomputer has the advantage that there is no need to include an additional hardware specifically designed to the internal flash memory.

Furthermore, the serial interface may be JTAG interface, so that JTAG interface that performs a boundary scan test can be shared with other functions. Therefore, the present microcomputer has an advantage in its simplified configuration.

According to the present invention, the microcomputer may comprise a means for rewrite permission that allows rewriting of the internal flash memory forcefully in debug mode even an input value of a FP terminal that permits rewriting of the internal flash memory. Therefore, the present invention has the advantage that rewriting of the internal flash memory forcefully in debug mode even an input value of a FP terminal is allowed.

According to the present invention, the microcomputer may comprise: a means for executing an E/W mode conversion program for shifting to a mode that allows an erase operation and a write operation on the internal flash memory by the CPU based on a branch instruction code for a E/W mode conversion program which is produced from the debugging tool; a means for executing an erase program for erasing a block corresponding to an address of the internal flash memory produced from the debugging tool through the execution of the erase program by the CPU based on the branch instruction code for the E/W mode conversion program which is produced from the debugging tool; a means for executing a status-ready wait program by the CPU based on a branch instruction code for a status-read wait program which is produced from the debugging tool to allow that the debugging tool to read out information about the status of executing the erase operation on the internal flash memory; and an E/W mode completion program for a shift to a normal mode through the execution of an E/W mode completion program by the CPU based on a branch instruction code for the E/W mode termination program produced from the debugging tool after repeating the execution of both means for executing the erase program and status-ready wait program only a predetermined number of times in accordance with blocks to be cleared from the internal flash memory if the information about the status of executing the erase operation on the internal flash memory is recognized as normal. Therefore, the microcomputer of the present invention has the advantage that a series of the steps in the erase operation for erasing data of predetermined blocks in the internal flash memory with respect to the branch instruction code from the debugging tool.

According to the present invention, the microcomputer may comprise a means for executing an E/W mode conversion program for shifting to a mode that allows an erase operation and an write operation on the internal flash memory by the CPU based on a branch instruction code for a E/W mode conversion program which is produced from the debugging tool; a means for executing an erase program for erasing a block corresponding to an address of the internal flash memory produced from the debugging tool through the execution of the erase program by the CPU based on the branch instruction code for the E/W mode conversion program which is produced from the debugging tool; a means for executing a write program for writing write data produced from the debugging tool to an address of the internal flash memory produced from the debugging tool through the execution of the write program by the CPU based on a branch instruction for the write program produced from the debugging tool; a means for executing a status-ready wait program by the CPU based on a branch instruction code for a status-ready wait program which is produced from the debugging tool to allow that the debugging tool to read out information about the status of executing the write operation on the internal flash memory; and an E/W mode completion program for a shift to a normal mode through the execution of an E/W mode completion program by the CPU based on a branch instruction code for the E/W mode termination program produced from the debugging tool after repeating the execution of the means for executing the erase program, the means for executing the write program, and the means for executing the status-ready wait program only a predetermined number of times in accordance with blocks to be rewritten into the internal flash memory if the information about the status of executing the write operation on the internal flash memory is recognized as normal. Therefore, the microcomputer of the present invention has the advantage that a series of the steps in the write operation for writing data of predetermined blocks in the internal flash memory with respect to the branch instruction code from the debugging tool.

The present invention has been described in detail with respect to preferred embodiments, and it will now be obvious to those skilled in the art that changes and modifications may be made without departing from the invention in its broader aspects, and it is the intention, therefore, in the appended claims to cover all such changes and modifications as fall within the true spirit of the invention.

What is claimed is:

1. A microcomputer comprising:
    a first storage means that stores a program for rewriting data into an internal flash memory;
    a second storage means that stores internal flash information with respect to the internal flash memory;
    an interface that makes a connection to a debugging tool; and
    a CPU, wherein
        the CPU allows
        reading of the internal flash information by the debugging tool through the interface,
        receiving of write data based on the internal flash information from the debugging tool through the interface, and
        rewriting of the write data as new contents into the internal flash memory in accordance with the program for rewriting data into the internal flash memory.

2. The microcomputer according to claim 1, wherein the first storage means is a part of an internal flash memory.

3. The microcomputer according to claim 1, wherein the program for rewriting data into the internal flash memory, having:
    an E/W mode conversion program for shifting to a mode that allows an erase operation and a write operation on the internal flash memory;
    an erase program for erasing contents of the internal flash memory;
    a write program for writing new contents into the internal flash memory;
    a status-ready wait program for indicating the completion of the erase operation and the write operation; and
    an E/W mode completion program for returning from a mode that allows both erase and write operations on the internal flash memory to a normal mode.

4. The microcomputer according to claim 1, wherein the second storage means is at least a part of an internal flash memory.

5. The microcomputer according to claim 1, wherein the internal flash information includes:
    block information about block sizes and addresses of the internal flash memory; and
    rewrite program information about the leading addresses of the rewrite program.

6. The microcomputer according to claim 1, wherein the internal flash information includes information that indicates a location of storing a security code.

7. The microcomputer according to claim 1, wherein the internal flash information includes information that indicates locations of areas to be used for saving the rewrite program of the internal flash memory and holding the write data temporarily.

8. The microcomputer according to claim 1, wherein the internal flash information includes information about a size of the area to be used for holding the write data temporarily at the time of rewriting the internal flash memory.

9. A microcomputer comprising:
    a first storage means that stores a program for rewriting of an internal flash memory;
    a second storage means that stores internal flash information with respect to the internal flash memory;
    an interface that makes a connection to a debugging tool; and
    a CPU, wherein
        the CPU allows
        execution of debugging based on an instruction code of a debug program held in a first register by the debugging tool through the interface in conjunction with holding internal flash information stored in the second storage means in a second register so that the internal flash information is readable by the debugging tool through the interface, and
        a rewrite operation in which write data based on the internal flash information held in a third register is written into the internal flash memory in accordance with the program for rewriting data into the internal flash memory by the debugging tool through the interface.

10. The microcomputer according to claim 9, wherein the interface is a JTAG interface and is a serial interface.

11. The microcomputer according to claim 9, further comprising:
    a means for rewrite permission that allows rewriting of the internal flash memory forcefully in debug mode when an input value of a FP terminal prohibits rewriting of the internal flash memory.

12. The microcomputer according to claim 9, further comprising:
    a means for executing an E/W mode conversion program for shifting to a mode that allows an erase operation and a write operation on the internal flash memory by the CPU based on a branch instruction code for a E/W mode conversion program which is produced from the debugging tool;

a means for executing an erase program for erasing a block corresponding to an address of the internal flash memory produced from the debugging tool through the execution of the erase program by the CPU based on the branch instruction code for the E/W mode conversion program which is produced from the debugging tool;

a means for executing a status-ready wait program by the CPU based on a branch instruction code for a status-ready wait program which is produced from the debugging tool to allow that the debugging tool to read out information about the status of executing the erase operation of the internal flash memory; and an E/W mode completion program for a shift to a normal mode through the execution of an E/W mode completion program by the CPU based on a branch instruction code for the E/W mode termination program produced from the debugging tool after repeating the execution of both means for executing the erase program and status-ready wait program only a predetermined number of times in accordance with blocks to be cleared from the internal flash memory if the information about the status of executing the erase operation on the internal flash memory is recognized as normal.

13. The microcomputer according to claim 9, further comprising:

a means for executing an E/W mode conversion program for shifting to a mode that allows an erase operation and a write operation on the internal flash memory by the CPU based on a branch instruction code for a E/W mode conversion program which is produced from the debugging tool;

a means for executing an erase program for erasing a block corresponding to an address of the internal flash memory produced from the debugging tool through the execution of the erase program by the CPU based on the branch instruction code for the E/W mode conversion program which is produced from the debugging tool;

a means for executing a write program for writing write data produced from the debugging tool to an address of the internal flash memory produced from the debugging tool through the execution of the write program by the CPU based on a branch instruction for the write program produced from the debugging tool;

a means for executing a status-ready wait program by the CPU based on a branch instruction code for a status-ready wait program which is produced from the debugging tool to allow that the debugging tool to read out information about the status of executing the write operation on the internal flash memory; and an E/W mode completion program for a shift to a normal mode through the execution of an E/W mode completion program by the CPU based on a branch instruction code for the E/W mode termination program produced from the debugging tool after repeating the execution of the means for executing the erase program, the means for executing the write program, and the means for executing the status-ready wait program only a predetermined number of times in accordance with blocks to be rewritten into the internal flash memory if the information about the status of executing the write operation on the internal flash memory is recognized as normal.

* * * * *